US009395823B2

(12) United States Patent
Jung et al.

(10) Patent No.: US 9,395,823 B2
(45) Date of Patent: Jul. 19, 2016

(54) USER TERMINAL DEVICE AND INTERACTION METHOD THEREOF

(71) Applicant: SAMSUNG ELECTRONICS CO., LTD., Suwon-si (KR)

(72) Inventors: Jong-woo Jung, Suwon-si (KR); In-sik Myung, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 35 days.

(21) Appl. No.: 14/282,308

(22) Filed: May 20, 2014

(65) Prior Publication Data

US 2014/0340339 A1 Nov. 20, 2014

(30) Foreign Application Priority Data

May 20, 2013 (KR) ........................ 10-2013-0056794

(51) Int. Cl.
*G06F 3/03* (2006.01)
*G06F 3/0354* (2013.01)
*G06F 3/0488* (2013.01)

(52) U.S. Cl.
CPC .......... *G06F 3/03545* (2013.01); *G06F 3/0488* (2013.01); *G06F 2203/04106* (2013.01); *G06F 2203/04806* (2013.01)

(58) Field of Classification Search
CPC ............ G06F 3/03545; G06F 3/04886; G06F 3/04883; G06F 2203/04806; G06F 2203/04807
See application file for complete search history.

(56) References Cited

U.S. PATENT DOCUMENTS

| 4,883,926 A * | 11/1989 | Baldwin ................. G06F 3/038 178/19.01 |
| 5,347,295 A * | 9/1994 | Agulnick .............. G06F 1/1626 345/156 |
| 7,735,024 B2 | 6/2010 | Li et al. |
| 2004/0233178 A1* | 11/2004 | Silk ........................ G06F 1/3203 345/179 |
| 2005/0057534 A1* | 3/2005 | Charlier ................ G06F 3/0312 345/179 |
| 2009/0167702 A1 | 7/2009 | Nurmi |
| 2010/0023387 A1* | 1/2010 | Pan ........................ G06Q 30/02 705/14.4 |
| 2010/0080491 A1* | 4/2010 | Ohnishi .............. G06F 3/03545 382/298 |
| 2010/0321322 A1 | 12/2010 | Sohn |
| 2011/0060988 A1* | 3/2011 | Mysliwy ............. G06F 3/04817 715/702 |

(Continued)

FOREIGN PATENT DOCUMENTS

| JP | 2011-168038 A | 9/2011 |
| JP | 2012-153087 A | 8/2012 |

(Continued)

OTHER PUBLICATIONS

Communication dated Nov. 27, 2014 issued by European Patent Office in counterpart European Patent Application No. 14169167.5.

(Continued)

*Primary Examiner* — Sanjiv D Patel
(74) *Attorney, Agent, or Firm* — Sughrue Mion, PLLC

(57) ABSTRACT

A user terminal device is provided, which includes a sensor configured to sense a user operation with respect to a display; and a controller configured to operate in a first interaction mode in which an operation that corresponds to a touch point of a pen is performed if a pen touch with respect to the display is sensed by the sensor, to switch over to a second interaction mode if the controller determines that the pen is put on the display, and to perform an operation that corresponds to a line on the display on which the pen is put.

20 Claims, 31 Drawing Sheets

(56) References Cited

U.S. PATENT DOCUMENTS

| | | |
|---|---|---|
| 2011/0248939 A1 | 10/2011 | Woo et al. |
| 2012/0280949 A1* | 11/2012 | Huang .................. G02B 27/20 345/179 |
| 2012/0299969 A1* | 11/2012 | Chen ....................... G06F 3/046 345/667 |
| 2013/0009907 A1* | 1/2013 | Rosenberg ............. G06F 3/046 345/174 |
| 2013/0019158 A1* | 1/2013 | Watanabe .......... G06F 3/04883 715/230 |
| 2013/0021288 A1* | 1/2013 | Karkkainen ........... G06F 3/016 345/173 |
| 2013/0038579 A1* | 2/2013 | Boyd ...................... B43K 7/02 345/179 |
| 2013/0082937 A1* | 4/2013 | Liu ........................ G06F 1/3262 345/173 |
| 2014/0168177 A1* | 6/2014 | Mkrtchyan ............. G06F 3/041 345/179 |

FOREIGN PATENT DOCUMENTS

| | | |
|---|---|---|
| JP | 2012-164274 A | 8/2012 |
| JP | 2012-168901 A | 9/2012 |

OTHER PUBLICATIONS

Communication dated May 6, 2016 issued by the European Patent Office in counterpart Application No. 14 169 167.5.

* cited by examiner

USER TERMINAL DEVICE AND INTERACTION METHOD THEREOF

CROSS-REFERENCE TO RELATED APPLICATION

This application claims priority under 35 U.S.C. §119(a) to Korean Patent Application No. 10-2013-0056794, filed on May 20, 2013, in the Korean Intellectual Property Office, the disclosure of which is incorporated herein by reference in its entirety.

BACKGROUND

1. Field

The exemplary embodiments relate to a user terminal device and an interaction method thereof, and more particularly to a user terminal and an interaction method thereof, which can operate in a plurality of different interaction modes according to pen manipulation methods.

2. Description of the Related Art

With the development of electronic technology, various types of electronic devices have been developed and sold. In particular, user terminal devices that users carry, such as a cellular phone, a PDA, a tablet PC, and a laptop PC, have recently been used.

Such user terminal devices provide services to users using various applications. Users can execute desired applications through a selection of icons that are displayed on home screens or application icon screens.

A user can perform an interaction, such as execution of various kinds of programs installed in a user terminal device or reproduction of content, through a direct touch of the screen using an input device, such as a finger or a pen.

As functions of a user terminal device are gradually becoming more diverse, there have been increasing needs for various interaction methods. Up to now, however, a user terminal device performs an interaction only through touching a screen using an input device or moving an input device near the screen.

Accordingly, various interaction techniques have been requested to satisfy user's needs.

SUMMARY

The exemplary embodiments may address at least the above needs and may provide at least the advantages described below, and an aspect of the exemplary embodiments provides a user terminal device and an interaction method thereof, which can provide various interaction modes according to pen manipulation methods.

According to an aspect of an exemplary embodiment, there is provided a user terminal device including a sensor configured to sense a user operation with respect to a display; and a controller configured to operate in a first interaction mode in which an operation that corresponds to a touch point of a pen is performed if a pen touch with respect to the display is sensed by the sensor, to switch over to a second interaction mode if the controller determines that the pen is put on the display, and to perform an operation that corresponds to a line on the display on which the pen is put.

If the sensor simultaneously senses a hovering operation of the pen at a plurality of points on the display, and the controller determines that a distance between the plurality of points corresponds to a length of the pen, the controller thereby determines that the pen is put on the display.

If the sensor senses that an object that is included in a screen displayed on the display is touched by the pen in the first interaction mode, the controller may execute a program that matches the object.

If the sensor senses that a drawing is created by the pen on a screen displayed on the display in the first interaction mode, the controller may display a line according to a trace of the drawing.

If the controller determines that the pen is put on an object that is included in a screen displayed on the display, the controller may switch over to the second interaction mode, fix the object based on the line on the display on which the pen is put, and change a shape of the object according to a subsequent user operation.

If the sensor senses a subsequent user operation to move an object that is included in a screen displayed on the display in a direction towards the line on the display on which the pen is put in the second interaction mode, the controller may align the object based on the line.

According to another aspect of an exemplary embodiment, there is provided a user terminal device including a sensor configured to sense a pen operation by a pen having a nib including a core connected to a built-in coil and a conductor connected to a conductive body; and a controller configured to perform a first interaction operation if the conductor touches a display and to perform a second interaction operation that is different from the first interaction operation if the core touches the display.

The first interaction operation may be an operation to select an object displayed at a touch point, and the second interaction operation may be an operation to draw a line along a handwriting trace of the pen.

According to still another aspect of an exemplary embodiment, there is provided an interaction method of a user terminal device, the interaction method including operating, in response to sensing a pen touch with respect to a display of the user terminal device, in a first interaction mode to perform an operation that corresponds to a touch point of the pen; switching over to a second interaction mode in response to determining that the pen is put on the display; and performing, in response to a subsequent user operation being performed in a state where the user terminal device operates in the second interaction mode, an interaction operation that corresponds to a line on which the pen is put and the subsequent user operation.

The switching over to the second interaction mode may include determining that the pen is put on the display in response to simultaneously sensing a hovering operation of the pen at a plurality of points on the display and determining that a distance between the plurality of points corresponds to a length of the pen.

The interaction method may further include executing, in response to determining that an object that is displayed on the display is touched by the pen in the first interaction mode, a program that matches the object.

The interaction method may further include displaying, in response to sensing a drawing by the pen on the display in the first interaction mode, a line according to a trace of the drawing.

The performing the interaction operation may include fixing, if the pen is put on an object that is displayed on the display, the object based on the line on which the pen is put, and changing a shape of the object according to the subsequent user operation.

The performing the interaction operation may include aligning, in response to sensing the subsequent user operation to move an object that is displayed on the display in a direction towards the line on which the pen is put in the second interaction mode, the object based on the line.

According to still another aspect of an exemplary embodiment, there is provided an interaction method of a user terminal device, the interaction method including sensing whether a pen having a nib including a core connected to a built-in coil and a conductor connected to a conductive body touches a display of the user terminal device; and performing a first interaction operation if the sensing indicates that the conductor touches the display and performing a second interaction operation that is different from the first interaction operation if the sensing indicates that the core touches the display.

The first interaction operation may be an operation to select an object displayed at a touch point, and the second interaction operation may be an operation to draw a line along a handwriting trace of the pen.

According to still another aspect of an exemplary embodiment, there is provided a user terminal device including a sensor configured to sense a touch of a pen including a nib that is formed in an inclined line edge shape; and a controller configured to operate in one of a plurality of different interaction modes according to a touch area if the pen touches a display and to perform an interaction operation that corresponds to the touch area of the pen.

As described above, according to various exemplary embodiments, the user can perform various interaction operations using the pen.

BRIEF DESCRIPTION OF THE DRAWINGS

The above and other aspects, features and advantages of the exemplary embodiments will be more apparent from the following detailed description when taken in conjunction with the accompanying drawings, in which.

DETAILED DESCRIPTION OF EXEMPLARY EMBODIMENTS

Hereinafter, exemplary embodiments are described in detail with reference to the accompanying drawings.

Figure 1:
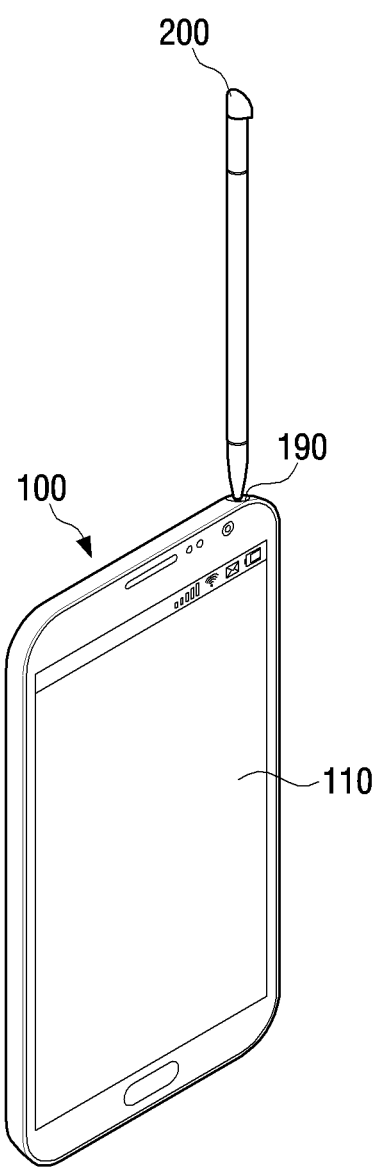
FIG. 1 is a view illustrating the configuration of a user terminal device according to an exemplary embodiment.

FIG. 1 is a view illustrating the configuration of a user terminal device according to an exemplary embodiment. A user terminal device 100 may be implemented as one of various types of electronic devices that can be used by a user. Although FIG. 1 exemplarily illustrates that the user terminal device 100 is a cellular phone, various kinds of user terminal devices 100 may be implemented. Specifically, the user terminal device 100 may be implemented as various types of devices, such as a cellular phone, a tablet PC, a laptop PC, a PDA, an MP3 player, a digital photo frame, a TV, a PC, and kiosk.

Referring to FIG. 1, a pen mount portion 190, on which a pen 200 can be mounted, is provided on a main body of the user terminal device 100. A display 110 is arranged on the front surface of the user terminal device 100. The pen 200 may be mounted on the pen mount portion 190. In FIG. 1, the pen mount portion 190 is formed as a hole into which the pen 200 can be inserted, but the pen mount portion 190 may be implemented in various forms. For example, the pen mount portion 190 may be formed on a side portion of the user terminal device 100 in the form of a fixing clip for fixing the pen 200.

A user may separate the pen 200 from the main body 100, and may perform an interaction operation by touching a screen that is displayed on the display 110 using the pen 200 or approaching the pen 200 near to the screen. In this case, a plurality of interaction modes may be selectively supported according to the use type of the pen 200. Hereinafter, the configuration of the user terminal device 100 and the interaction method thereof according to various exemplary embodiments will be described in detail.

Figure 2:
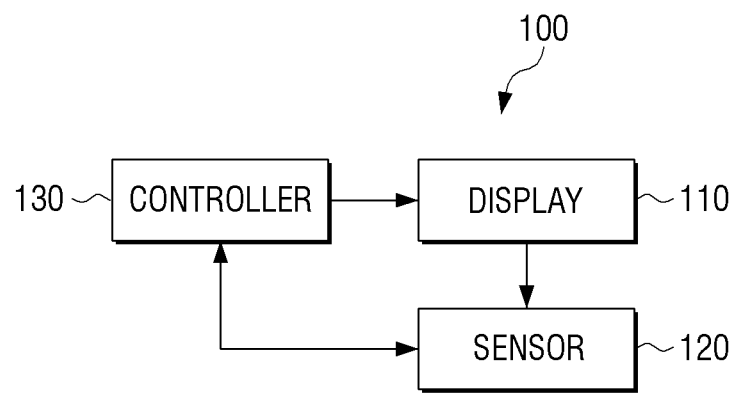
FIG. 2 is a block diagram illustrating the configuration of a user terminal device according to an exemplary embodiment.

Exemplary Embodiment that Provides Different Interaction Operations According to a Touch Area of the Pen FIG. 2 is a block diagram illustrating the configuration of a user terminal device according to an exemplary embodiment. Referring to FIG. 2, the user terminal device 100 includes a display 110, a sensor 120, and a controller 130. FIG. 2 illustrates only constituent elements that participate in the operations according to various exemplary embodiments, and an illustration of the remaining detailed constituent elements will be omitted.

The display 110 may display various kinds of screens, such as a home screen, an icon screen, a list screen, an application execution screen, a web browser screen, and a content reproduction screen. In the respective screens, various objects, such as icons, images, and texts, may be displayed. Applications may match some objects, such as icons. A user may instruct the performance of a desired control operation through selection of an object using his or her finger or the pen 200.

The sensor 120 may sense a user operation that is performed with respect to the display 110. The sensor 120 may sense various operations, such as a general touch operation in which a user touches a screen using his or her finger or other devices, a general hovering operation in which a user moves his or her finger or the like near the screen, a pen touch operation in which a user touches the screen using the pen 200, and a pen hovering operation in which a user moves the pen 200 such that the pen 200 approaches near to the screen. As an example, if a user touches an object that is displayed on the screen, the sensor 120 senses a corresponding touch point and notifies the controller 130 of the sensed touch point.

The controller 130 may control the overall operation of the user terminal device 100. If it is sensed that one icon is selected by the sensor 120, the controller 130 performs a control operation that corresponds to the icon.

Further, the controller 130 may determine whether the pen 200 is separated from the main body of the user terminal device 100 or is mounted in the main body. The pen mount or non-mount state may be implemented using various methods. As an example, in the case where the pen mount portion 190 is implemented in the form of a hole as illustrated in FIG. 1, a contact or a button that is configured to come in contact with the pen 200 may be provided in the hole. If the pen 200 is mounted in the pen mount portion 190, the contact comes in contact with the pen 200 or the button is pressed. In this case, a signal of a predetermined level may be input to the controller 130 by an electronic circuit connected to the pen mount portion 190. In contrast, if the pen 200 is separated from the pen mount portion 190, the pen 200 is moved apart from the contact or the button. Accordingly, the level of the signal that is applied from the pen mount portion 190 to the controller 130 is changed. The controller 130 may determine that the pen 200 is separated through sensing of such signal change.

The controller 130 selectively sets various interaction modes according to the use method of the pen 200, and performs an interaction operation according to a user operation that is performed in the selected mode.

In this exemplary embodiment, if the pen 200 touches the screen, the controller 130 selects an interaction mode based on the touch area.

Figure 3:
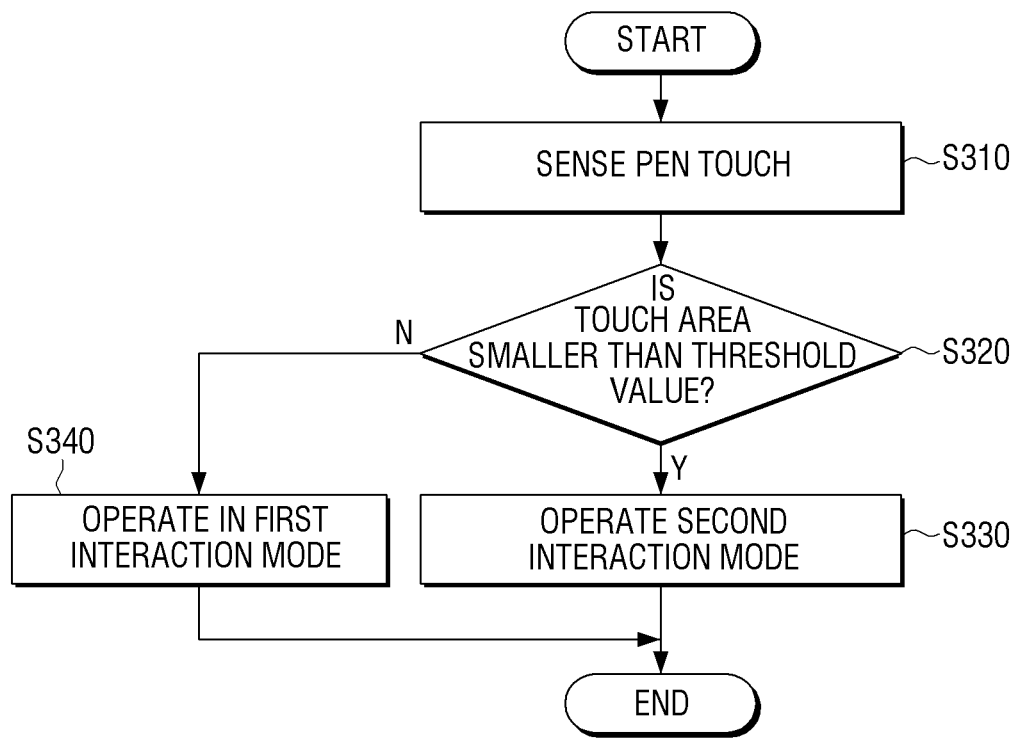
FIG. 3 is a flowchart illustrating an interaction method according to an exemplary embodiment.

FIG. 3 is a flowchart illustrating an interaction method according to an exemplary embodiment. Referring to FIG. 3, if a pen touch operation is sensed by the sensor 120 at operation S310, the controller 130 determines whether the touch area is smaller than a threshold value at operation S320. That is, the touch area may differ depending on a force that is applied to the pen 200 by a user or an angle at which the pen 200 touches the screen.

If the touch is made with a size that is smaller than the preset threshold value, the controller 130 operates in a first interaction mode at operation S330, and if the touch is made with a size that is equal to or larger than the threshold value, the controller 130 operates in a second interaction mode at operation S340. According to an exemplary embodiment, the second interaction mode refers to a mode in which an interaction operation that is different from the first interaction mode is performed by the same user operation. For example, the controller 130 may perform an interaction operation to draw a line on the screen according to a pen touch trace in the first interaction mode, and may perform an interaction operation to scroll the screen in the unit of a pixel according to the pen touch trace in the second interaction mode. Examples of such interaction modes will be described in detail later with reference to the drawings.

FIG. 2 exemplarily illustrates that the interaction mode is differently determined based on the touch area. However, the interaction mode may be determined according to various standards, such as the number of touch points, a touch position, a touch angle, and the number of touches, in addition to the touch area. Further, FIG. 2 exemplarily illustrates that one of two interaction modes including the first and second interaction modes is determined. However, three or more interaction modes may also be implemented according to other exemplary embodiments. In this case, a plurality of threshold values may be set. For example, if the touch is sensed by touch sensors that correspond to pixels, the number of which is smaller than x1, the controller 130 may operate in the second interaction mode, and if the touch is sensed by touch sensors that correspond to pixels, the number of which is equal to or larger than x2, the controller 130 may operate in the second interaction mode. Further, if the touch is sensed by touch sensors that correspond to pixels, the number of which is equal to or larger than x3, the controller 130 may operate in the third interaction mode.

In order to enable the touch area to be diversely changed, a nib portion of the pen 200 may be implemented in various shapes.

Figure 4:
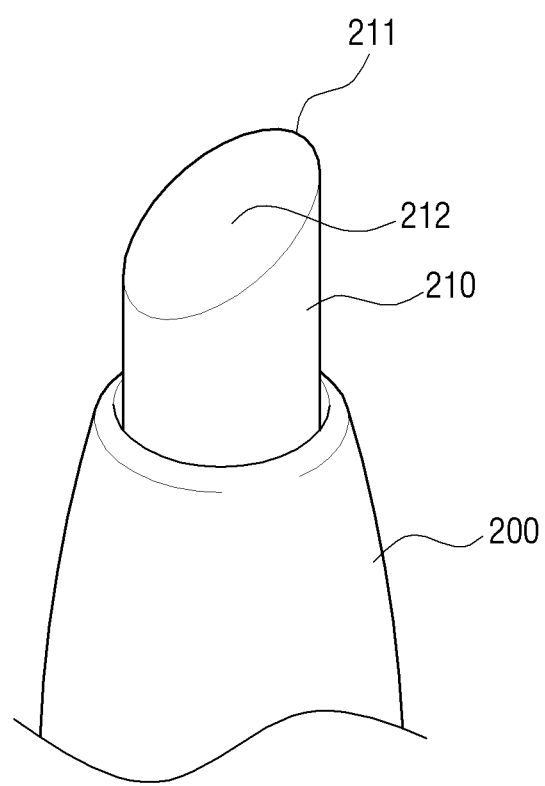
FIG. 4 is a view illustrating an example of a pen configuration.

FIG. 4 is a view illustrating an example of a pen configuration. Referring to FIG. 4, a nib 210 of the pen 200 is in a cylindrical shape of which one end is diagonally cut. Accordingly, an end point 211 is sharply formed, and an end surface 212 is in an elliptical shape.

Figure 5:
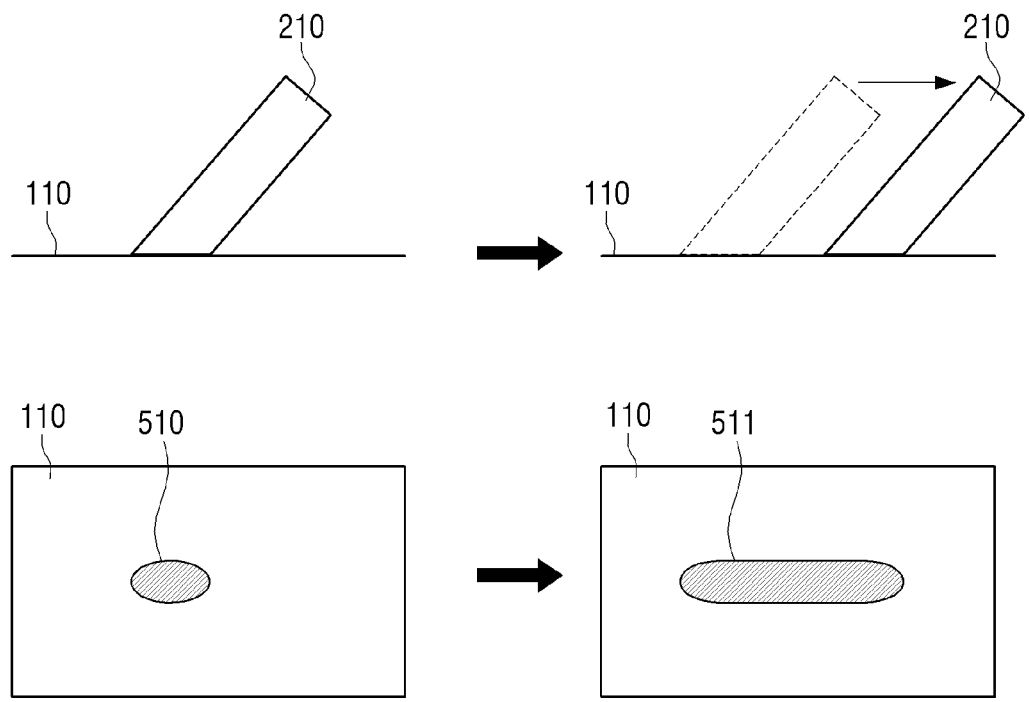
FIG. 5 is a diagram explaining an interaction method using a pen of FIG. 4.

FIG. 5 is a diagram explaining a screen touch method using the pen 200 of FIG. 4. As illustrated in FIG. 5, if the screen is touched in a state where the pen 200 is tilted in the direction of the end surface 212, the end surface 212 touches the screen. Accordingly, a relatively large touch area 510 is formed. In this state, if a user moves the touch point of the pen 200 to another point, the controller 130 determines that a thick line 511 is input along the moving trace.

Although not illustrated in FIG. 5, the user may touch the screen of the display 110 with the pen 200 in a state where the pen 200 stands at about 90°. In this case, only the end point 211 touches the display 110. Accordingly, a touch region is formed as a point or a thin line. If the user moves the pen 200 in this state, the controller 130 determines that a thin line is input along the moving trace.

As illustrated in FIG. 5, the user can input points of various sizes or lines of various thicknesses through tilting of the angle in a state where the user holds the pen 200. The controller 130 may perform different interaction operations according to the input type. That is, the controller 130 can operate in different interaction modes through discrimination of input of a thin point, input of a thick point, input of a thin line, and input of a thick line from each other.

Figure 6:
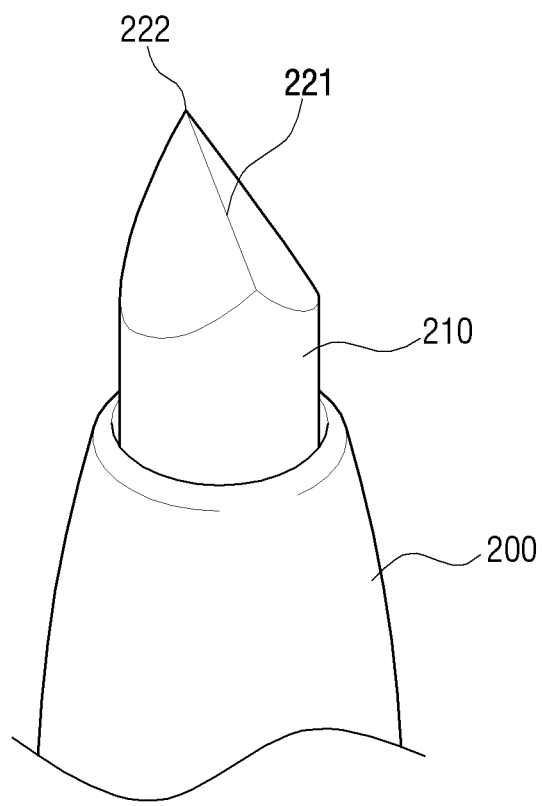
FIG. 6 is a view illustrating another example of a pen configuration.

FIG. 6 is a view illustrating another example of a pen configuration. Referring to FIG. 6, an end portion of the nib 210 may be in the shape of a tilted line edge 221. Accordingly, one end 222 of the line edge 221 may be formed to be sharper than the other end thereof.

Figure 7:
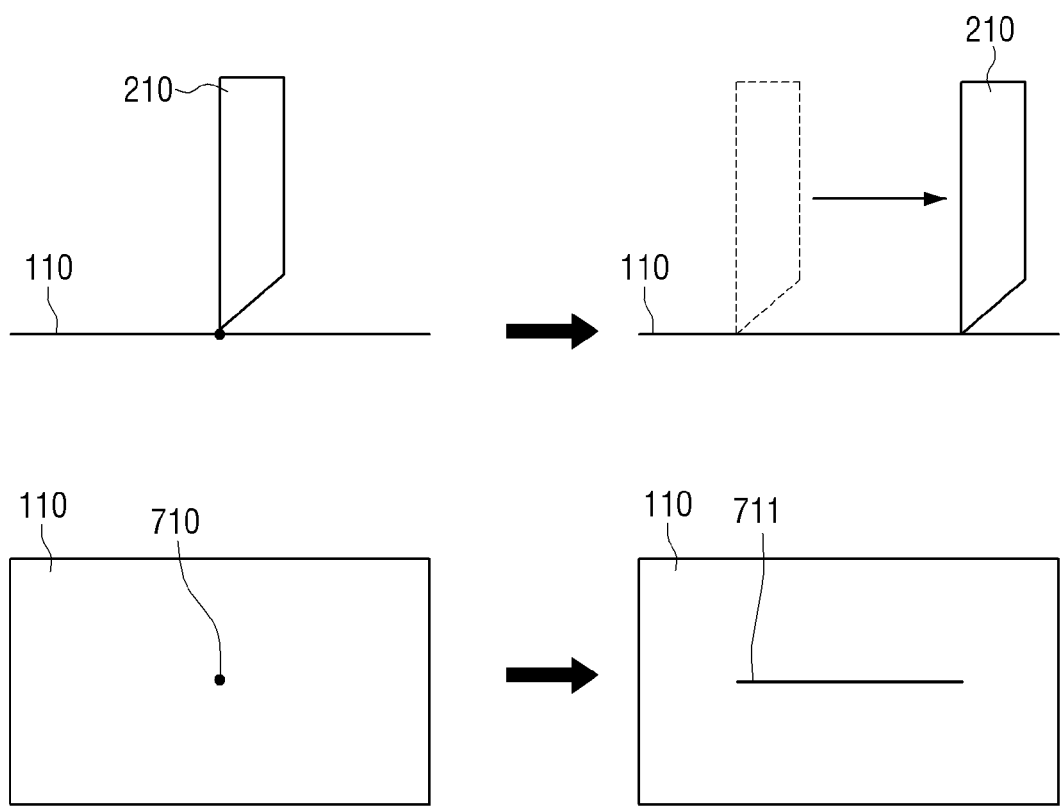
FIGS. 7 and 8 are diagrams explaining various interaction methods using a pen of FIG. 6.

FIG. 7 shows a case where the pen 200 of FIG. 6 in a standing state touches the screen. Referring to FIG. 7, the end portion 222 of the pen 200 touches the screen. Accordingly, a thin point 710 may be input. If the user moves the pen 200 in this state, a thin line 711 may be input along the moving trace.

Figure 8:
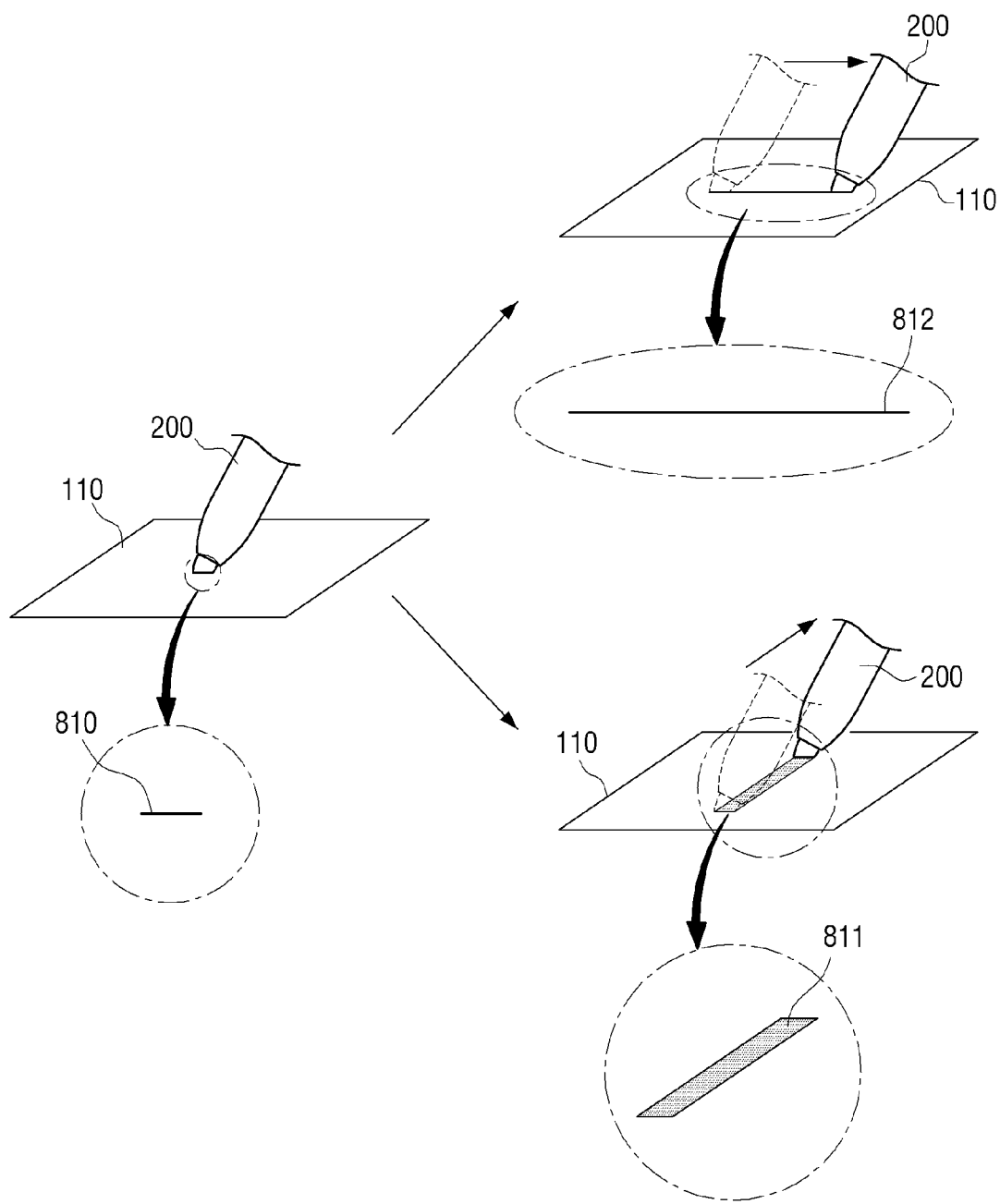

FIG. 8 shows a case where the pen 200 of FIG. 6 in a tilted state touches the screen. Referring to FIG. 8, if the pen 200 in the tilted state touches the screen, a thin line 810 is input on the screen. If the user moves the pen 200 in the direction that is perpendicular to the line edge 221 in this state, a thick line 811 is input. In contrast, if the user moves the pen 200 in the same direction as the line edge 221, a thin line 812 is input.

As described above, according to the touch area, the touch shape, and the touch angle of the pen 200, various types of inputs, such as a point, a line, and a shape (e.g., shapes having various surfaces), can be made, and the input types may be further discriminated according to the size or thickness of the point, the line, or the surface. The controller 130 may perform the interaction operations according to the input types through individual or partial matching of a plurality of interaction modes with respect to the various input types.

Examples of Interaction Operations

Hereinafter, interaction operations according to various exemplary embodiments will be described.

Figure 9:
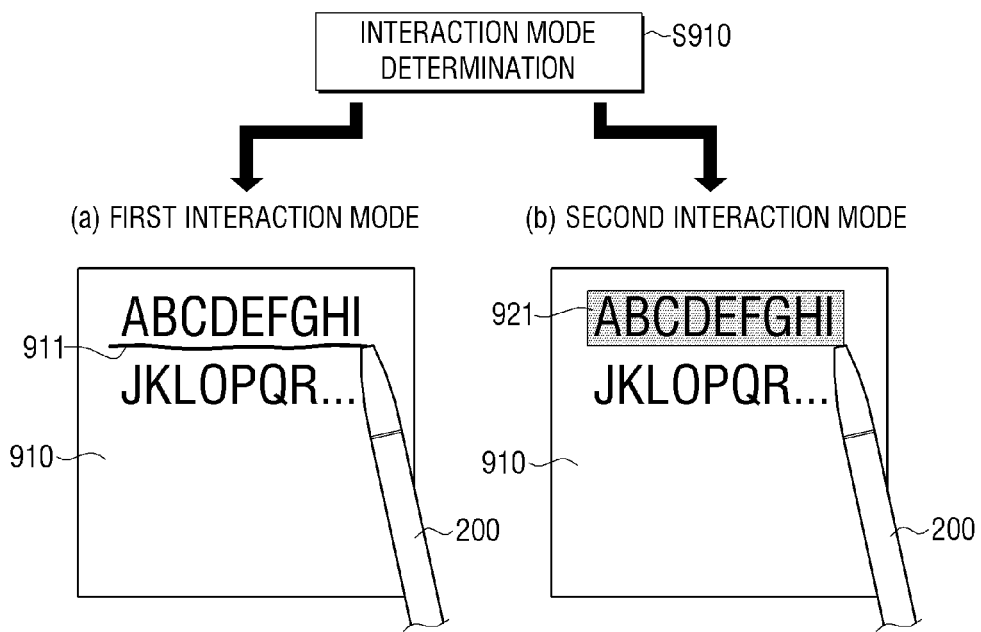
FIGS. 9 to 14 are diagrams explaining detailed examples of a plurality of different interaction modes.

Referring to FIG. 9, the controller 130 determines an interaction mode according to a use type of the pen 200 at operation S910. If it is determined that a first preset condition is satisfied, the controller 130 operates in a first interaction mode (a), and if it is determined that a second preset condition is satisfied, the controller 130 operates in a second interaction mode (b). The first condition and the second condition may be set according to various standards.

As an example, a case where the touch area is smaller than the threshold value may correspond to the first condition, and a case where the touch area is equal to or larger than the threshold value may correspond to the second condition. The controller 130 may determine whether the first condition or the second condition is satisfied through confirming of the number of sensors that have sensed the touch among the plurality of touch sensors included in the sensor 120.

As another example, a case where the angle formed between the pen 200 and the screen during the touch is equal to or larger than a threshold angle may correspond to the first condition, and a case where the angle is smaller than the threshold angle may correspond to the second condition. In this case, an acceleration sensor or geomagnetic sensor may be built in the pen 200. If the acceleration sensor is built in the pen, the acceleration sensor may sense the tilting (e.g., by sensing or several of pitch angle, roll angle, and yaw angle) of the pen 200. The controller 130 may determine whether the first condition or the second condition is satisfied through reception of tilting information from the pen 200. This feature will be described in detail later.

As still another example, a case where the touch is made in a state where the button provided on the pen 200 is not pressed may correspond to the first condition, and a case where the touch is made in a state where the button is pressed may correspond to the second condition. In this case, a coil, a capacitor, and a switch (not illustrated) connected to the button may be built in the pen 200. Accordingly, the level of the signal that is sensed by the sensor 120 may differ depending on the selection or non-selection of the button, and the controller 130 may determine whether the first condition or the second condition is satisfied based on the level of the signal.

As still another example, a case where pressure that is sensed by a pressure sensor built in the display 110 during the pen touch is lower than a threshold pressure may correspond to the first condition, and a case where the sensed pressure is equal to or higher than the threshold pressure may correspond to the second condition.

As still another example, a case where the touch is immediately released in a state where the pen touches the screen may correspond to the first condition, and a case where the touch state is maintained over the threshold time may correspond to the second condition. In this case, the controller 130 may determine whether the first condition or the second condition is satisfied through counting the touch time using a timer.

In addition, the first condition and the second condition may be set according to various standards. Further, the number of conditions may be set to three or more. The above-described condition determination may be applied to other exemplary embodiments in the same manner.

The controller 130 may perform various interaction operations according to the interaction modes. Referring to FIG. 9, if a drawing by the pen 200 is sensed on the screen 910 displayed on the display 110 in the first interaction mode (a), the controller 130 may display a line 911 according to the drawing trace. FIG. 9 illustrates a state where the screen 910 that includes various text characters (e.g., letters) is displayed. In this case, a user may perform an interaction operation, such as underlining on the screen 910 or inputting of a figure or a memorandum.

On the other hand, if a drawing by the pen 200 is sensed in the second interaction mode (b), the controller 130 determines that text characters corresponding to the drawing trace 921 are selected. FIG. 9 illustrates that a user inputs the drawing trace 921 of a thick line through moving of the pen 200 in a tilted state. If the drawing trace and the text line coincide with each other over a predetermined rate, the controller 130 selects the text characters included in the text line and displays the text characters in distinction from other text characters. The user may collectively perform editing, such as copy, change, delete, or cut operations with respect to the selected text, or may perform a search operation or other operations using the selected text as a keyword. Although not illustrated in FIG. 9, if the text selection is performed through the controller 130, a user may display various kinds of selectable menus on one side of the selected texts.

Figure 10:
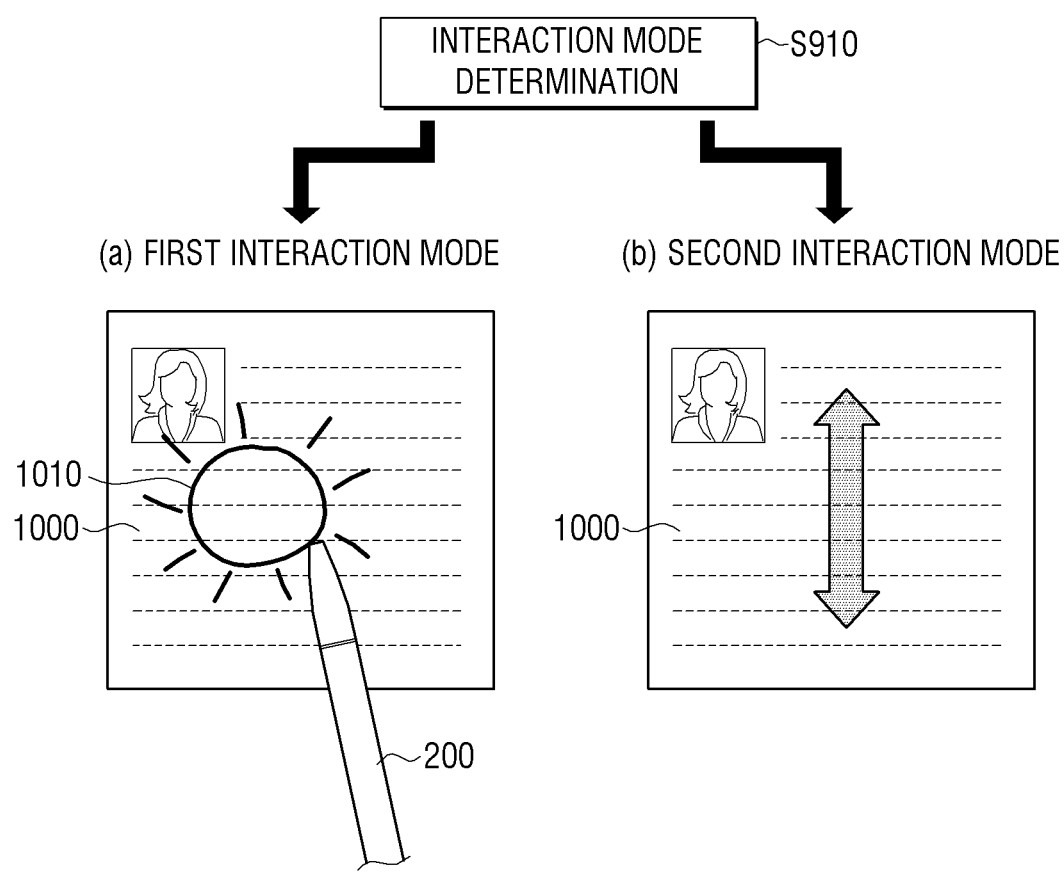

FIG. 10 is a diagram explaining an interaction operation according to still another exemplary embodiment. Referring to FIG. 10, a user may directly draw an object 1010 on a screen 1000 using the pen 200 in the first interaction mode (a).

In contrast, if a user performs dragging in upper or lower or left or right directions in a state where the user touches the screen 1000 using the pen 200 in the second interaction mode (b), the controller 130 may scroll the screen 1000 in the upper or lower or left or right directions according to the dragging direction. According to exemplary embodiments, the scroll may be performed in the unit of a screen page or in the unit of a pixel. Further, if the user merely touches an object using the pen 200 instead of a touch and dragging operation in the second interaction mode (b), the controller 130 may execute an application that matches the touched object and may perform a control operation, such as displaying of an execution screen.

Figure 11:
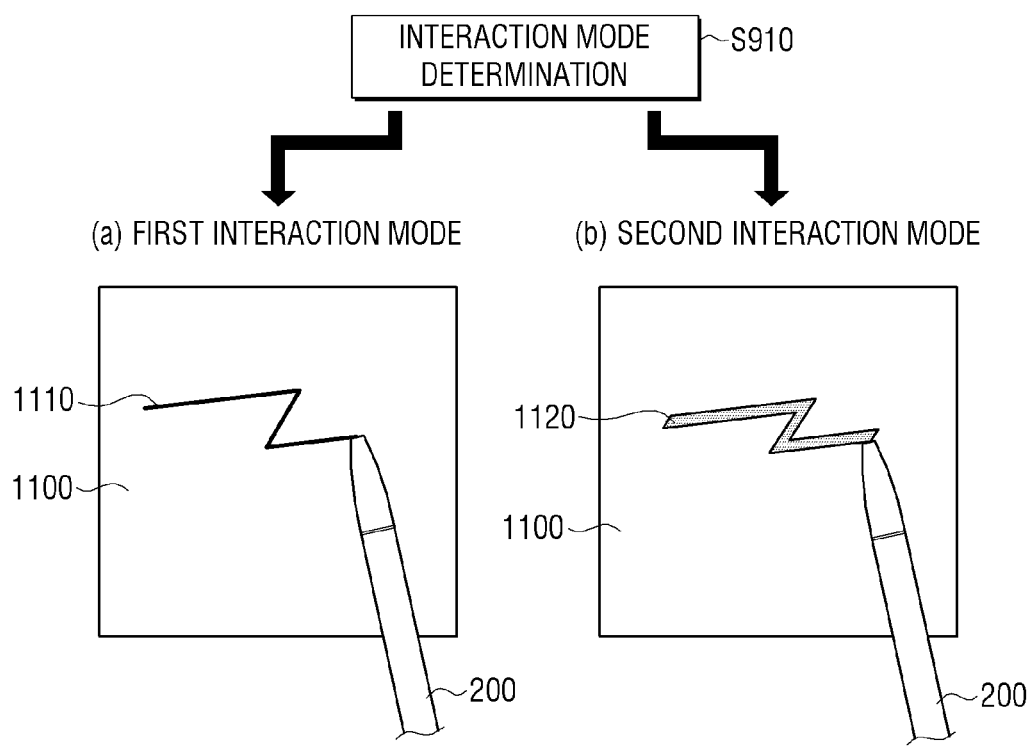

FIG. 11 is a diagram explaining an interaction operation according to still another exemplary embodiment. Referring to FIG. 11, the controller 130 may display a thin real line 1110 on a screen 1100 in the first interaction mode (a), and may display a thick real line 1120 on the screen 1100 in the second interaction mode (b). The thickness of the real line may be determined in proportion to the touch area of the pen 200 or may be determined in stages, such as a first thickness and a second thickness, based on the threshold value.

Figure 12:
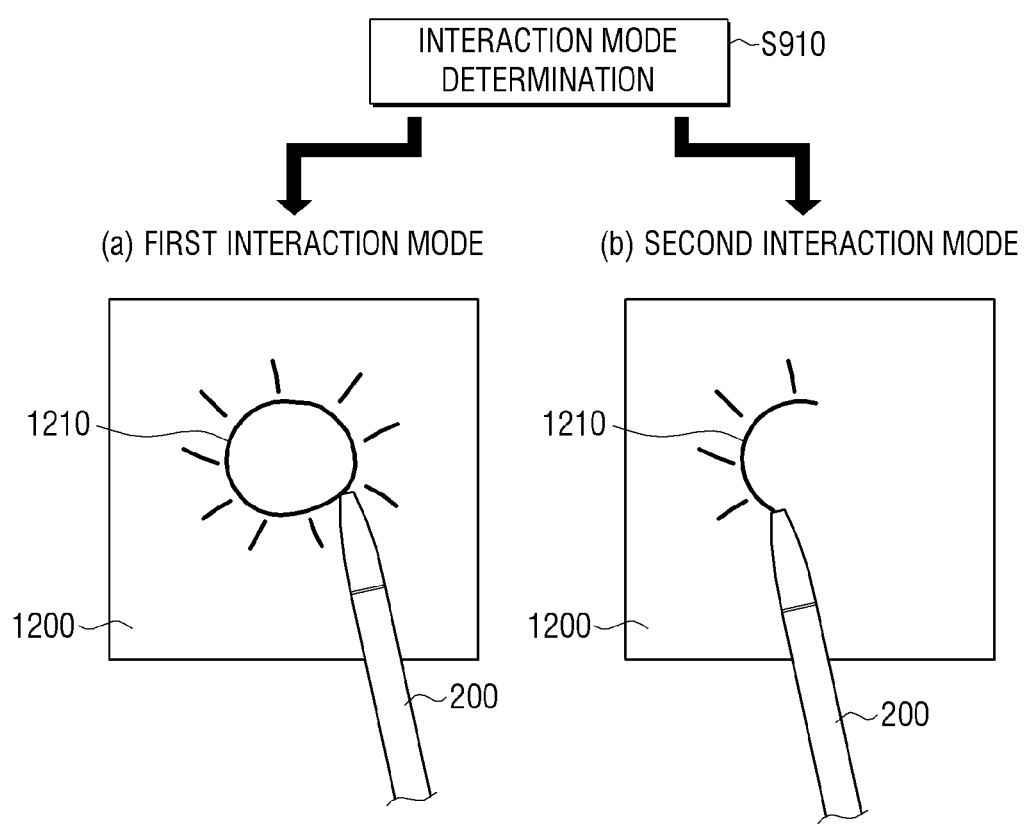

FIG. 12 is a diagram explaining an interaction operation according to still another exemplary embodiment of the present disclosure. Referring to FIG. 12, the controller 130 may generate an object 1210 by drawing a line on a screen 1200 according to a moving trace of the pen 200 in the first interaction mode (a). In contrast, the controller 130 may perform an interaction operation that deletes a line included in the pen moving trace by allocating an erase function to the pen 200 in the second interaction mode (b). That is, according to this exemplary embodiment, the controller 130 may allocate different functions with respect to the pen 200 by interaction modes. FIG. 12 illustrates a case where a pen function and an erase function are allocated. However, a function of displaying sharp handwriting, such as a pencil, pen, or ballpoint pen and a function of displaying thick handwriting, such as a brush or a highlighter, may also be respectively allocated.

Figure 13:
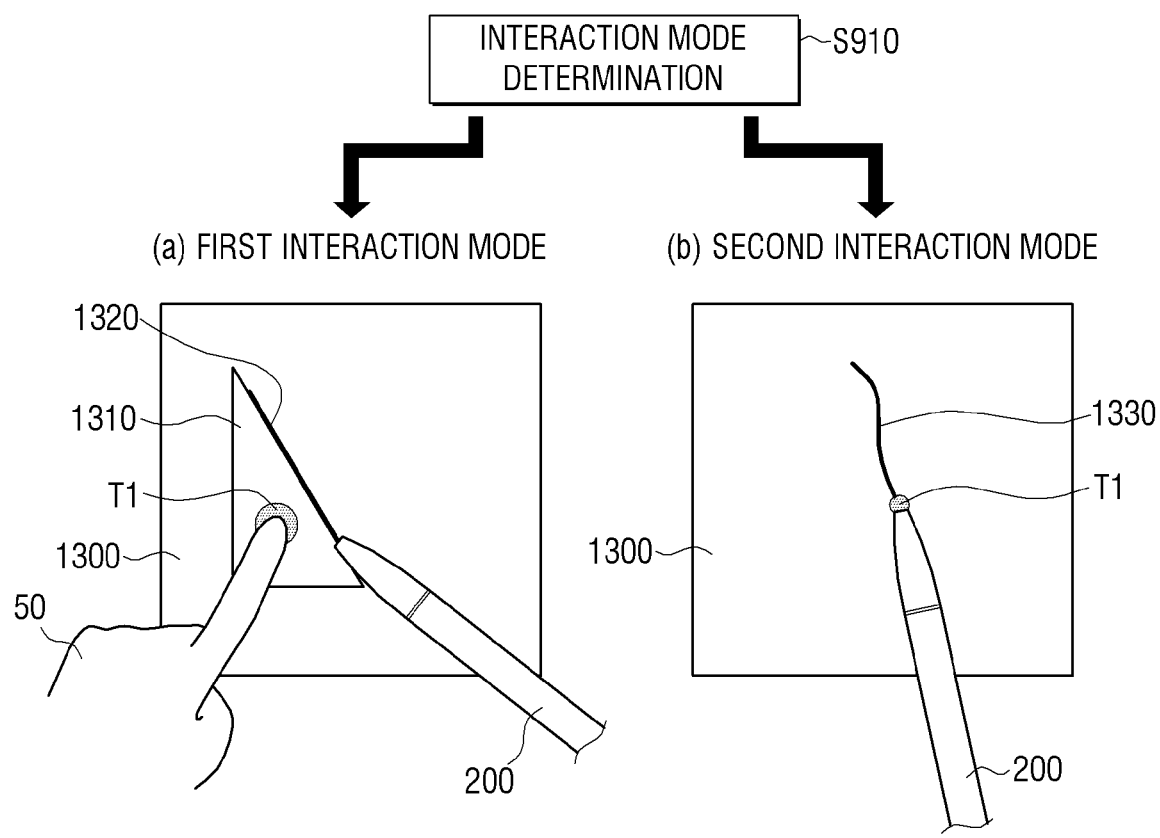

FIG. 13 is a diagram explaining an interaction operation according to still another exemplary embodiment. Referring to FIG. 13, the controller 130 may recognize both an operation by the pen 200 and an operation by a user's body 50 and may perform interaction operations that correspond to the respective operations in the first interaction mode (a). FIG. 13 illustrates a state where a screen 1300 including a ruler 1310 is displayed. If a user touches the ruler 1310 with his or her finger, the controller 130 may change the display position of the ruler 1310 according to the movement of the touch point T1. If the user draws one side of the ruler 1310 using the pen 200, a straight line 1320 can be drawn by the ruler 1310.

In contrast, the controller 130 may sense only the operation by the pen 200 and may perform an interaction operation corresponding to the operation in the second interaction mode (b). Referring to FIG. 13, an interaction operation that draws a line 1330 along the moving trace of the pen 200 is illustrated.

Figure 14:
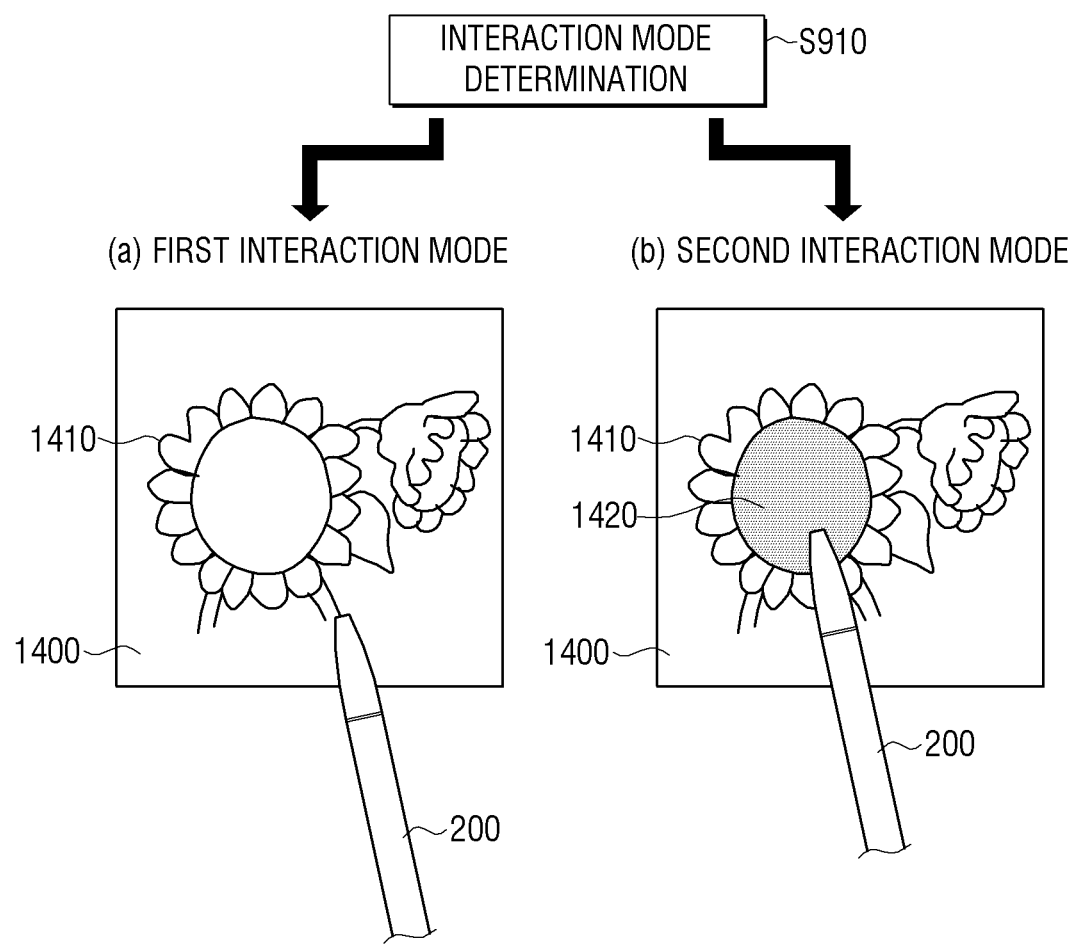

FIG. 14 is a diagram explaining an interaction operation according to still another exemplary embodiment. Referring to FIG. 14, the controller 130 may perform a pen tool operation to draw an object 1410 on a screen 1400 according to a moving trace of the pen 200 in the first interaction mode (a). In contrast, the controller 130 may perform a paint bucket tool operation to fill respective regions in the object 1410 with colors selected by the user. The controller 130 divides the object 1410 into a plurality of regions using closed curves that constitute the object 1410 that is drawn by the user as boundaries. If one of the regions 1420 is touched, a color, which may be preset by the user, is displayed on the corresponding region 1420.

In the above-described exemplary embodiments, the operations in the first interaction mode and in the second interaction mode are separately described. However, the first and second interaction modes may be implemented in a reverse manner according to exemplary embodiments. For example, if an object included in the screen displayed on the display is touched by the pen in the first interaction mode, an operation to execute a program that matches the object may be performed, and a drawing operation according to the pen 200 may be performed in the second interaction mode. That is, the respective interaction modes as described above according to the exemplary embodiments may be variously combined and implemented according to circumstances.

Further, in the above-described exemplary embodiments, the nib is configured so that the user can change the contact area of the pen. In addition, the nib may be implemented in various forms so that the touch area is changed according to the pen use method.

Figure 15:
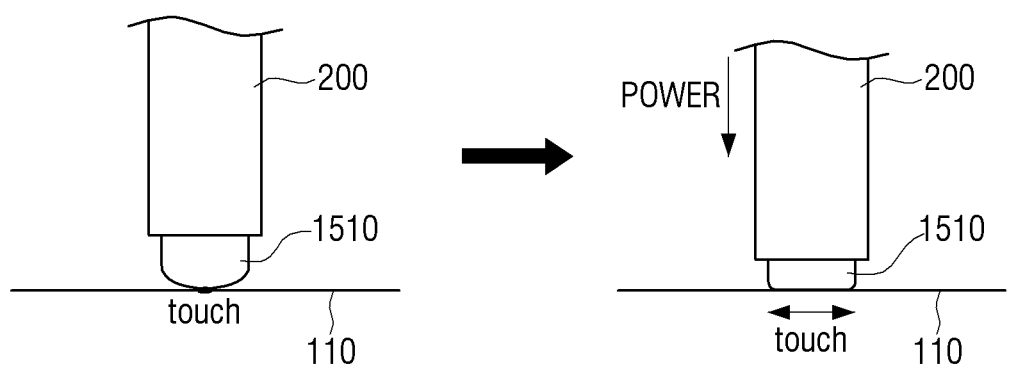
FIG. 15 is a view illustrating still another example of a pen configuration.

FIG. 15 is a view illustrating still another example of a pen configuration that can change the touch area. Referring to FIG. 15, a nib 1510 may be made of an elastic member that has flexible characteristics. Accordingly, if a user touches the screen of the display 110 with a small amount of force using the pen 200, the touch area is set to be small. In contrast, if the screen of the display 110 is touched with a larger amount of force than the small force in the direction of the screen using the pen 200, the nib 1510 is pressed and thus the touch area becomes large. If the touch area is smaller than a preset threshold value, the controller 130 operates in the first interaction mode, and if the touch area is equal to or larger than the preset threshold value, the controller 130 operates in the second interaction mode.

As described above, the controller 130 may selectively operate in any one of the plurality of interaction modes according to the angle formed between the pen 200 and the screen during the touch.

Figure 16:
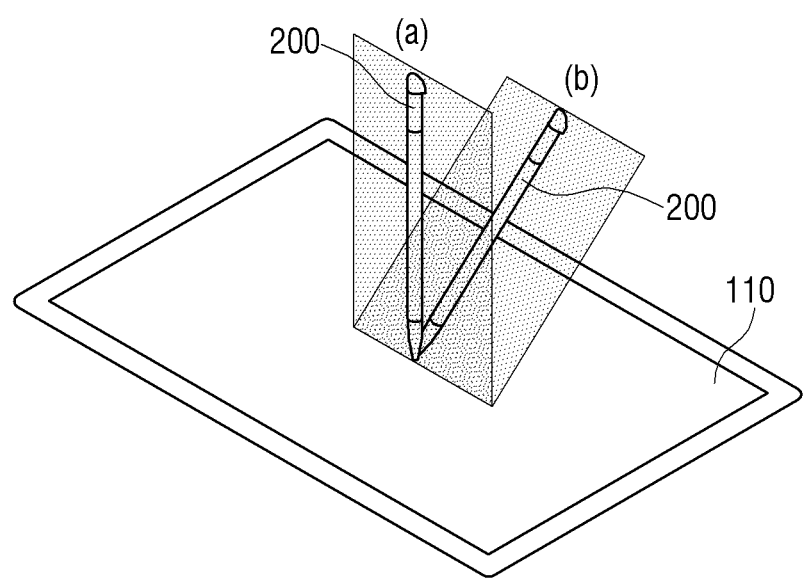
FIG. 16 is a diagram explaining an interaction method according to still another exemplary embodiment.

Exemplary Embodiment that Provides Various Interaction Operations According to Touch Angles FIG. 16 is a diagram explaining the operation of a user terminal device 100 according to an exemplary embodiment. Referring to FIG. 16, the controller 130 can recognize the pen 100 in a state (a) where the pen 200 stands over a threshold angle and in a state (b) where the pen 200 is tilted below the threshold angle based on the screen of the display 110. In this case, an acceleration sensor or a geomagnetic sensor may be built in the pen 200. If the acceleration sensor is built in the pen, the acceleration sensor may sense the tilting (e.g., sense one or several of pitch angle, roll angle, and yaw angle) of the pen 200. Specifically, if the acceleration sensor is built in the pen 200, X, Y, and Z axes that are orthogonal to each other are determined according to the arrangement direction of respective axes fluxgates that constitute the acceleration sensor. The pitch angle refers to a rotating angle that is measured in the case where the pen is rotated about the Y axis, and the roll angle refers to a rotating angle that is measured in the case where the pen is rotated about the X axis. The yaw angle refers to a rotating angle that is measured in the case where the pen is rotated about the Z axis. The pitch angle and the roll angle may be measured by the acceleration sensor, and the yaw angle may be measured by the geomagnetic sensor or a gyro sensor. According to an exemplary embodiment, the pen 200 senses the change of the pitch angle, the roll angle, and the yaw angle using the acceleration sensor, the geomagnetic sensor, or the gyro sensor, and transmits the result of the sensing to the user terminal device 100. The controller 130 may determine the interaction mode by comparing the result of the sensing with a preset threshold condition.

Accordingly, even though the pen configuration as described above is not changed, a user can perform various interaction operations simply through a pen standing operation or pen tilting operation. Since the interaction operations have been described in detail with reference to various drawings as described above, a repeated explanation thereof will be omitted.

Unlike the above-described exemplary embodiments, the nib portion may be made of a plurality of different materials to perform different interaction operations according to the touched materials.

Figure 17:
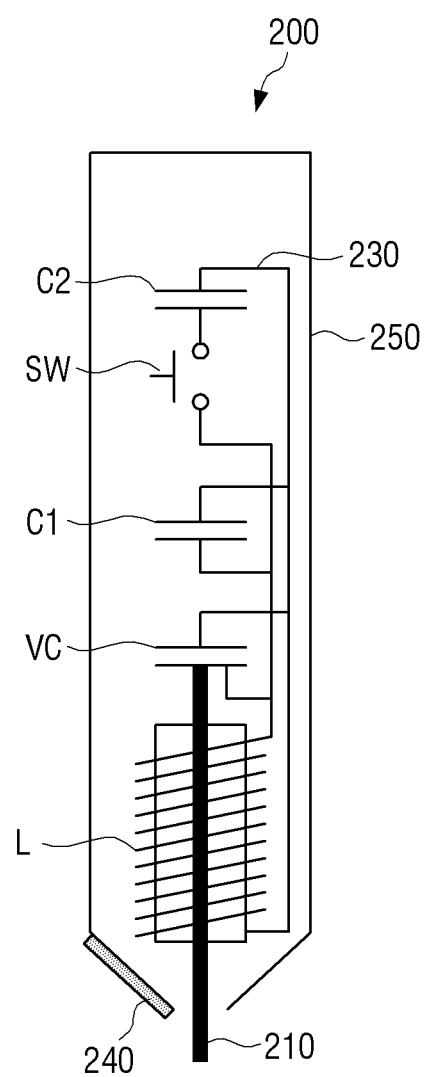
FIGS. 17 and 18 are diagrams explaining other examples of a pen configuration.

Exemplary Embodiment that Provides Different Interaction Operations According to Touched Portions FIG. 17 is a diagram explaining a pen configuration according to still another exemplary embodiment. Referring to FIG. 17, the pen 200 includes a circuit 230 including a coil L, capacitors C1, C2, and VC, and a switch SW. Through the capacitors C1, C2 and the coil L, the circuit 230 may operate as a resonance circuit.

A body 250 of the pen 200 is made of a conductive material, and the coil L is wound on a core 210. One end of the core 210 on which the coil L is wound projects outside the body 250 to form a nib portion. Further, a conductor 240 that is connected to the conductive body 250 is formed on one side of the core 210. As a result, the nib portion includes the conductor 240 and the core 210. The switch SW is connected to a button (not illustrated) formed on the outside of the body 250. If the button is not pushed, the switch opens the capacitor C2, and if the button is pushed, the switch connects the capacitor C2 to the circuit 230 in parallel. Accordingly, the capacitance of the circuit 230 is changed depending on whether the button is selected.

If the user touches the display 110 with the pen 200 in a standing state, the core 210 touches the screen. In contrast, if the user touches the display 110 with the pen 200 in a tilted state in the direction of the conductor 240, the conductor 240 touches the screen. The controller 130 can distinctively recognize the various types of touches of the core 210 and the conductor 240. The recognizing method will be described in detail later.

The controller 130 can operate in the different interaction modes by distinguishing between the touches of the core 210 and the conductor 240. For example, if it is sensed that the conductor 240 touches the screen, the controller 130 performs the first interaction operation, and if it is sensed that the core 210 touches the screen, the controller 130 performs the second interaction operation that is different from the first interaction operation. Since examples of the first and second interaction operations have been described, repeated explanations thereof will be omitted.

Figure 18:
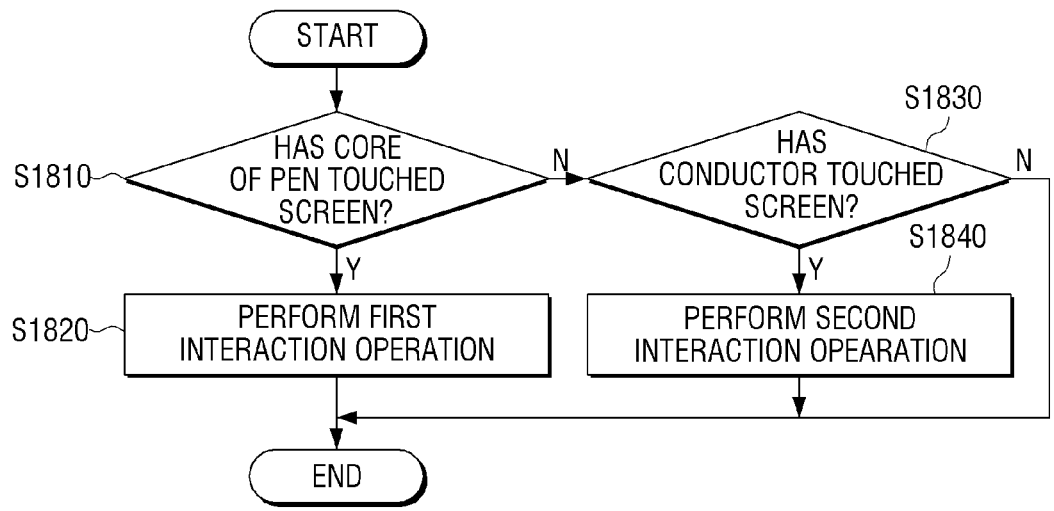

FIG. 18 is a flowchart illustrating an interaction method according to an exemplary embodiment. Referring to FIG. 18, if the core 210 of the pen touches the screen at operation S1810, the controller 130 operates in the first interaction mode. Accordingly, the controller 130 performs the first interaction operation according to a user's pen touch at operation S1820. In contrast, if the conductor 240 of the pen touches the screen at operation S1830), the controller 130 operates in the second interaction mode. Accordingly, the controller 130 performs the second interaction operation according to the user's pen touch at operation S1840. Since examples of the first and second interaction operations have been described, repeated explanations thereof will be omitted.

FIG. 17 illustrates the structure in which the conductor 240 and the core 210 are fixedly formed on the nib portion and the conductor 240 can touch the screen only when the user tilts the pen 200. However, the configuration of the pen 200 may be differently implemented.

Figure 19:
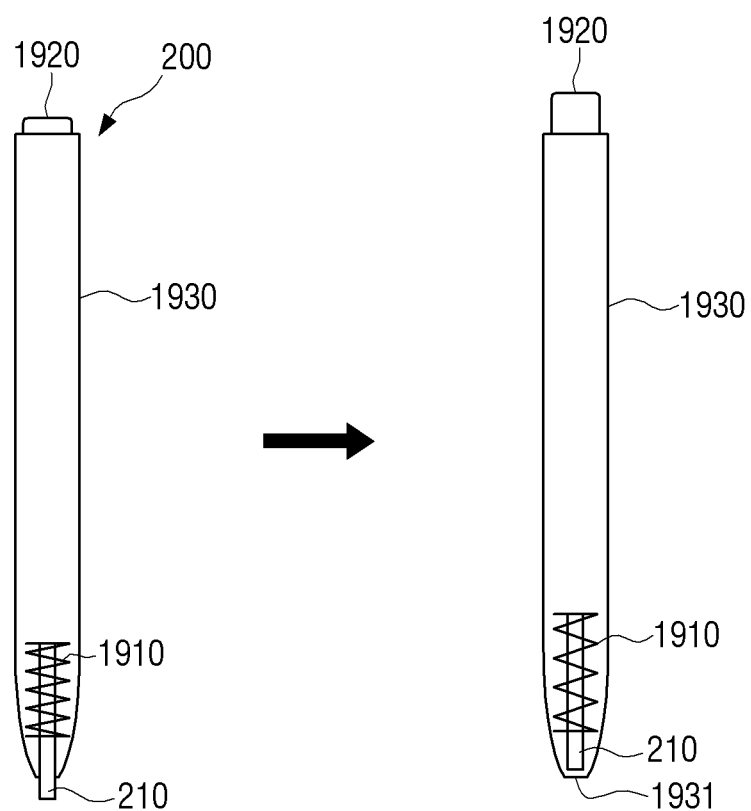
FIG. 19 is a view explaining operations in different interaction modes according to a pen use angle.

FIG. 19 is a view illustrating a pen configuration according to still another exemplary embodiment. Referring to FIG. 19, at one end of the body 1930 of the pen 200, a hole is formed through which the nib 210 projects or is recessed, and at the other end of the body 1930, a switch 1920 that can push the nib 210 out of the hole is formed. The nib 210 may be formed as one end portion of the core on which the coil 1910 is wound.

Although not illustrated in FIG. 19, the nib 210 may be formed to be long enough to extend to the switch 1920, and a spring and a stopper may be provided in the vicinity of the nib 210. Accordingly, if the user presses the switch 1920, the nib 210 is pushed out of the hole by a structure (not illustrated) provided at a lower end of the switch 1920 and is fixed by the spring and the stopper. If the user presses the switch 1920 again, the nib 210 comes into the inside of the hole by a restoring force of the spring in a state where the stopper is released.

Accordingly, even if the user tilts the pen in a state where the nib 210 projects, the nib 210 touches the screen, and a hole inlet portion 1930 touches the screen regardless of the user's standing and tilting of the pen 200 in a state where the nib 210 is inside the hole.

The body 1930 and the hole inlet portion 1931 are formed of a conductive material and are connected to each other. Accordingly, if the user holds the pen 200 and the hole inlet portion 1930 touches the screen, the controller 130 may determine that a general touch operation is sensed. In contrast, in a state where the nib 210 is projected, the controller 130 may determine that a pen touch operation is sensed. Accordingly, the controller 130 can selectively execute a plurality of different interaction modes according to the result of the sensing.

In the above-described exemplary embodiments, the methods for providing the plurality of interaction modes according to various standards, such as the touch area, material of the touched portion, and touch angle, have been described. In still another exemplary embodiment of the present disclosure, a new interaction operation may be performed through an operation to put the pen on the screen.

Figure 20:
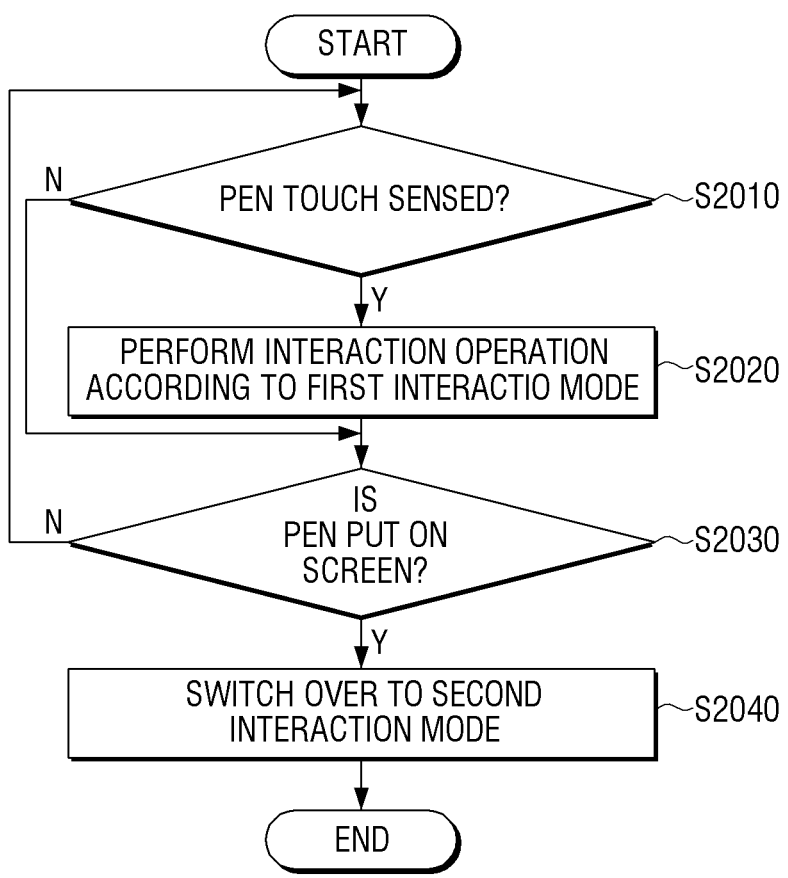
FIG. 20 is a flowchart illustrating an interaction method according to still another exemplary embodiment.

Exemplary Embodiment that Provides Different Interaction Operations According to Pen Positions FIG. 20 is a flowchart illustrating an interaction method according to still another exemplary embodiment. Referring to FIG. 20, if a general pen touch is sensed at operation S2010, the user terminal device 100 performs an interaction operation according to a first interaction mode at operation S2020. The first interaction mode may be implemented by at least one of various interaction modes as described above. As one example, if an object is touched by the pen 200 on the screen in the first interaction mode, the controller 130 may perform a control operation that matches the touched object. Further, the controller 200 may perform drawing of a line according to the moving trace.

If it is sensed that the pen is put on the screen at operation S2030, the controller 130 switches the first interaction mode over to a second interaction mode. Whether the pen is put on the screen may be determined using various methods according to the configuration of the pen 200.

As an example, if the user puts down the pen 200 on the screen and touches the pen 200 with his or her hand in a state where the body of the pen 200 is made of a conductor, the controller may determine the region where the pen 200 touches the screen using a touch sensor. Accordingly, if it is sensed that touch points of which the number exceeds a preset number occur and the touch points form one line, the controller 130 determines that the pen 200 is put on the screen.

Further, if a preset condition is satisfied in the state where the pen 200 has a plurality of coils built in the pen 200, the controller 130 may determine that the pen 200 is put on the screen.

In FIG. 20, according to an exemplary embodiment, a case where the pen 200 is put on the screen and a case where the pen 200 is not put on the screen are discriminated from each other, and different interaction operations are performed with respect to the cases. However, according to still another exemplary embodiment, different interaction operations may be performed according to various positions that the pen 200 is put on the screen, such as in the vicinity of the user terminal device 100, a bezel portion of the main body, and a keypad portion in addition to the screen.

Figure 21:
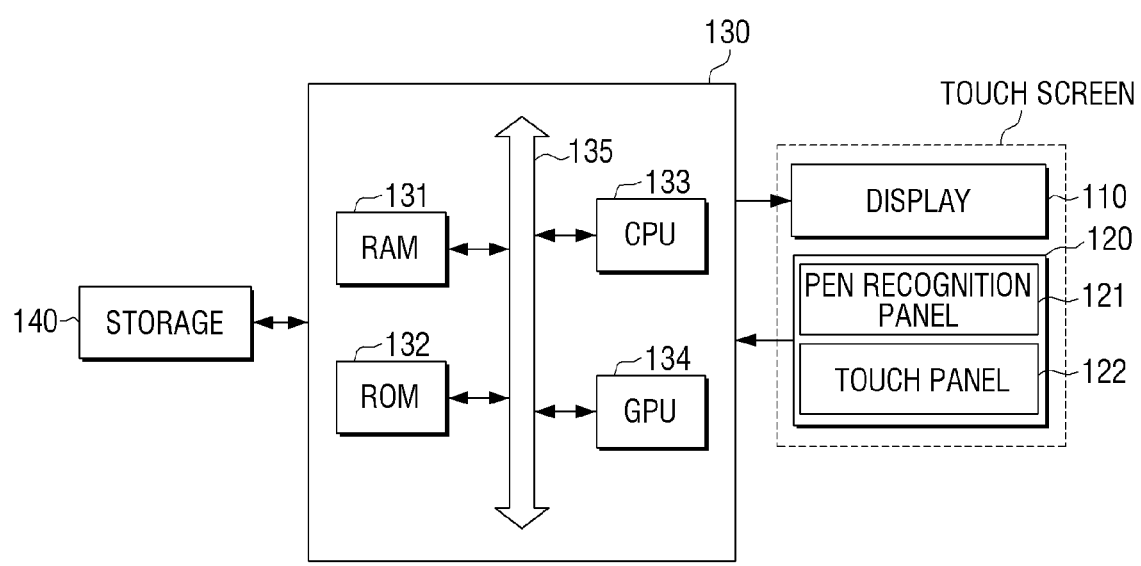
FIG. 21 is a block diagram illustrating the configuration of a user terminal device according to still another exemplary embodiment.

FIG. 21 is a block diagram illustrating the configuration of a user terminal device according to still another exemplary embodiment. Referring to FIG. 21, a user terminal device 100 includes a display 110, a sensor 120, a controller 130, and a storage 140.

The storage 140 is a constituent element for storing various kinds of programs and data required for the operation of the user terminal device 100. As an example, the storage 140 may store data of various kinds of objects displayed on the screen, information on a control operation that matches a particular object or objects, and preset condition information. Although not illustrated in FIG. 2, the storage 140 may also be provided in other exemplary embodiments.

The controller 130 controls the overall operation of the user terminal device using various kinds of programs and data stored in the storage 140.

The controller 130 includes a RAM 131, a ROM 132, a CPU 133, a GPU (Graphic Processing Unit) 134, and a bus 135. The RAM 131, ROM 132, CPU 133, and GPU 134 may be connected to each other through the bus 135.

The CPU 133 accesses the storage 140 and performs booting using the O/S stored in the storage 140. Further, the CPU 133 performs various operations using various kinds of programs, content, and data stored in the storage 140.

In the ROM 132, a command set for system booting is stored. If a turn-on command is input and the power is supplied, the CPU 133 copies the O/S stored in the memory 140 into the RAM 131 according to the command stored in the ROM 132, and boots the system by executing the O/S. If the booting is completed, the main CPU 133 copies various kinds of programs stored in the storage 140 into the RAM 131, and performs various kinds of operations by executing the programs copied into the RAM 131.

The GPU 134 displays a screen once the booting of the user terminal device 100 is performed. Specifically, the GPU 134 may generate a screen that includes various objects such as an icon, an image, and text using an operator (not illustrated) and a rendering portion (not illustrated). The operator calculates attribute values, such as coordinate values, shapes, sizes, and colors for displaying respective objects according to the layout of the screen. The renderer generates screens of various layouts including objects based on the attribute values calculated by the operator. The screen generated by the renderer is provided to the display 110 to be displayed in a display region.

The GPU 134 may render various kinds of screens using data stored in the storage 140. Further, if a user performs a drawing operation on the screen using his or her finger or the pen, the GPU 134 renders an object according to the contents of the calculation. For example, if a user draws a circle using the pen 200, the circle is displayed on the screen according to the drawing trace.

The GPU 134 expresses the screen and the object on the different graphic layers. That is, the GPU 134 overlaps and displays object layers on an upper side of the screen layer. In some exemplary embodiments as described above, different types of interaction operations may be performed according to the pen use method. The GPU 134 may perform an interaction operation that corresponds to the interaction mode. For example, in the exemplary embodiment of FIG. 9, a line 911 may be displayed in the first interaction mode (a), and the line may not be displayed in the second interaction mode (b). Alternatively, the CPU 133 may perform the interaction operation to select a text that corresponds to the moving trace of the pen. In addition, operations according to various interaction modes may be performed as described above with reference to FIGS. 10 to 14.

The controller 130 may detect a boundary line of an object rendered on the object layer and may recognize the object according to the boundary line. The controller 130 may store pixel coordinate values for specifying the recognized object point and the pixel values in the storage 140 as object information. If the user touches the screen, the controller 130 may determine which object has been selected based on the stored values. If an object that matches a mail program is selected, the controller 130 may execute a mail program, and may display the executed screen on the display 110.

The display 110 displays various types of screens as described above. The display 110 may be implemented as various types of displays, such as an LCD (Liquid Crystal Display), an OLED (Organic Light Emitting Diodes) display, and a PDP (Plasma Display Panel). In the display 110, a driving circuit and a backlight unit, which can also be implemented in the form of a-si TFT, a LTPS (Low Temperature Poly Silicon) TFT, or an OTFT (Organic TFT), may be included in the display 110.

FIG. 21 illustrates that the display 110 and the sensor 120 are implemented by one touch screen.

If a user operation using various input devices is sensed, the sensor 120 notifies the controller 130 of the result of the sensing. For example, if the user touches one point on the screen with his or her finger or the pen, the sensor 120 notifies the controller 130 of the x, y coordinate values. If the user moves the touch point in a touched state, the sensor 120 notifies in real time the controller 130 of the touch coordinate values being changed. The sensor 120 can sense not only the direct touch but also movement of the pen as the pen approaches close to the screen.

Specifically, the sensor 120 may include a pen recognition panel 121 and a touch panel 122. The pen recognition panel 121 senses a proximity input or touch input of the pen 200 and outputs an event signal according to the result of the sensing. The pen recognition panel 121 may be configured to use an electro-magnetic resonance (EMR) method, and may sense the touch input or proximity input according to the strength change of the electromagnetic field through the pen proximity or touch.

Specifically, in the case where the pen 200 includes a built-in resonance circuit composed of a coil and a capacitor, the pen recognition panel 121 may include an electromagnetic induction coil sensor (not illustrated) and an electromagnetic signal processing circuit (not illustrated). The electromagnetic induction coil sensor has a grid structure in which a plurality of loop coils are arranged to cross each other. The electromagnetic signal processing circuit successively provides an AC signal to the respective loop coils of the electromagnetic induction coil sensor and transfers signals output from the loop coils to the controller 130.

If the pen 200 exists in the vicinity of the loop coils of the pen recognition panel 121 in a state where the pen 200 has a built-in resonance circuit, the magnetic field that is transmitted from the corresponding loop coil generates current based on the mutual electromagnetic induction in the resonance circuit in the pen 200. Based on the current, an induced magnetic field is generated from the coil that constitutes the resonance circuit in the pen, and the pen recognition panel 121 detects the induced magnetic field from the loop coil that is in a signal reception state to sense the approaching position or touch position of the pen. In the foregoing description, the pen 200 is described as an example of an input device, but any object that can generate current based on electromagnetic induction can be used as the input device according to an exemplary embodiment. The pen recognition panel 121 may be arranged on the lower side of the display 110 and may be activated according to generation of a specific event or by default.

The touch panel 122 is a constituent element for sensing a physical touch input through a user's body or other objects. The touch panel 122 may be, for example, implemented in the form of a touch film, a touch sheet, or a touch pad. If the touch is sensed, the touch panel 122 outputs a touch event value that corresponds to the sensed point.

The touch panel 122 may include a touch sensor of various types, such as a capacitance type or pressure reduction type. As an example, if a capacitance type touch panel 122 is implemented, the touch panel 122 is configured by coating a thin metal conductive material (e.g., ITO (Indium Tin Oxide)) on both surfaces of glass to make current flow on the glass surface and coating a dielectric material that can store charge on the metal conductive material. If the surface of the touch panel 122 is touched, a predetermined amount of charge moves to the contact position by static electricity, and the touch panel 122 senses the touched position through recognition of the changed amount of current according to the movement of the charge, to track the touch event. That is, the touch panel 122 can sense a touch by a finger or a general touch pen.

FIG. 21 illustrates that the pen recognition panel 121 and the touch panel 122 are provided as separate panels. However, the two panels 121 and 122 may instead be implemented as one panel. Accordingly, the sensor 120 can sense and distinguish the touch operation and proximity operation by the user's finger and the touch operation and proximity operation by the pen. The controller 130 can perform various control operations according to the results of the sensing.

The pen recognition panel 121 can recognize operations using the pen to a precision which is approximately in the unit of a pixel. Accordingly, in the pen use mode, the controller 130 may reduce the size of a menu that is displayed on the screen, but the user can easily select the corresponding menu. In order to sense a fine operation using the pen, the pen recognition panel 121 may be manufactured with a size that is equal to or larger than the size of the display panel in the display 10. Accordingly, it is possible to sense the user operation in the unit of a pixel in a boundary portion of the display panel.

Figure 22:
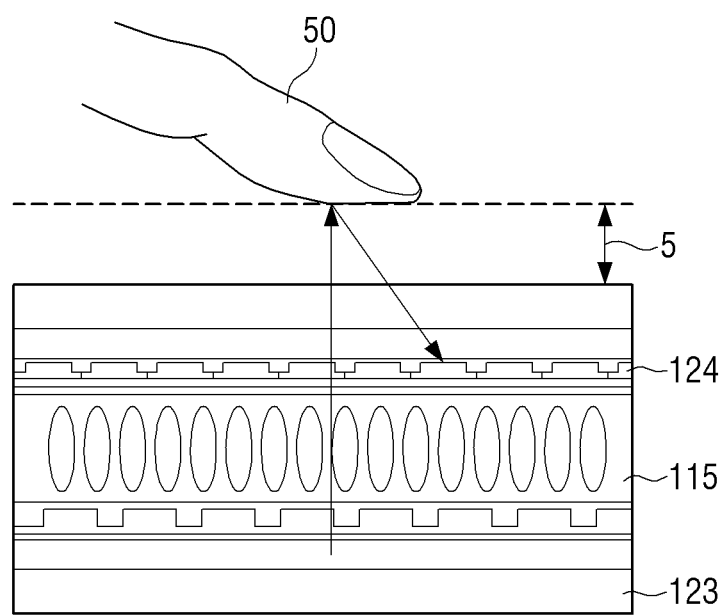
FIGS. 22 and 23 are views explaining the configuration of a sensor sensing a user operation.

On the other hand, FIG. 22 illustrates an example of the detailed configuration of the sensor 120. Referring to FIG. 22, the sensor 120 may further include an infrared source 123 and an infrared sensor 124. The infrared source 123 is arranged on one surface of the display panel 115 in the display 110, and the infrared sensor 124 is arranged on the other surface of the display panel 115. The infrared source 123 irradiates infrared rays in the direction of the surface of the display panel 115. Accordingly, a predetermined region in which an approach of the user's finger 50 can be recognized exists on the surface of the display panel 115. This region is an effective recognition region 5 in which the proximity touch can be recognized.

The infrared sensor 124 may include a plurality of infrared sensing elements that are arranged in the form of an array. Accordingly, if the finger 50 approaches the effective recognition region 5, the infrared sensor 124 senses the infrared rays that are reflected by the finger 50 and generates an infrared scan image. The user terminal device 100 can sense the proximity touch input using the generated infrared scan image.

On the other hand, the sensor 120 can sense the approach of the pen 200. As described above, the pen recognition panel 121 may include an electromagnetic induction coil sensor and the electromagnetic signal processing circuit (not illustrated)

Figure 23:
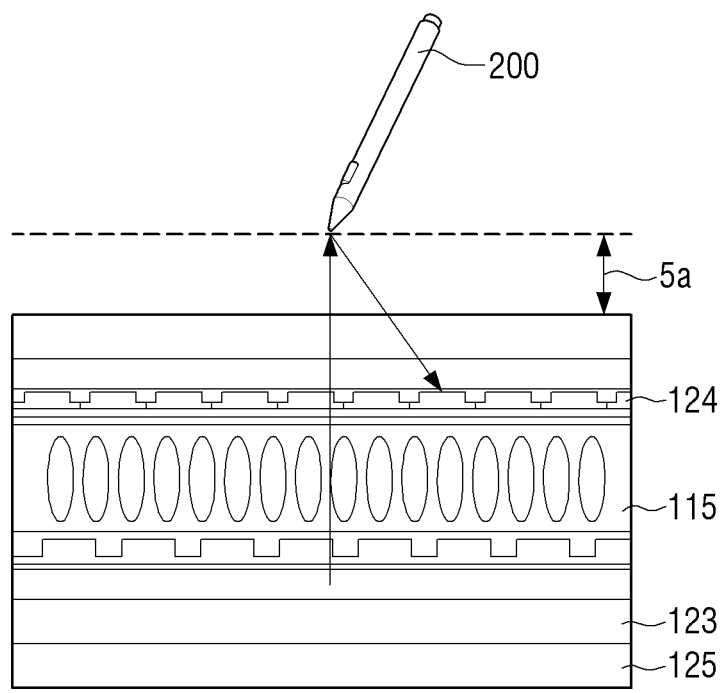

FIG. 23 is a view illustrating an example of a configuration for sensing the approach of the pen 200 using the pen recognition panel 121. Referring to FIG. 23, an electromagnetic induction coil sensor 125 may be further included in the display 110. If the pen 200 approaches, the magnetic field on the approach point changes due to the magnetic field coil inside the pen 200, and the changed magnetic field is sensed through the electromagnetic induction coil sensor 125 at the point. The sensed magnetic field is processed by the electromagnetic signal processing circuit and is input to the controller 130. Based on the input value, the point that the pen 200 approaches can be sensed. Further, the controller 130 can also determine whether a direct touch is performed according to the level of the magnetic field change value.

As illustrated in FIG. 23, if the infrared source 123, the infrared sensor 124, and the pen recognition panel 121 are used, the user can discriminately recognize whether a user touches or approaches the screen by a part of the body, such as the user's finger, or using the pen 200. The controller 130 can selectively perform various control operations according to the kind and operation type of the input device.

On the other hand, the operation of the controller 130 may be performed by execution of various kinds of pieces of software stored in the user terminal device 100.

Figure 24:
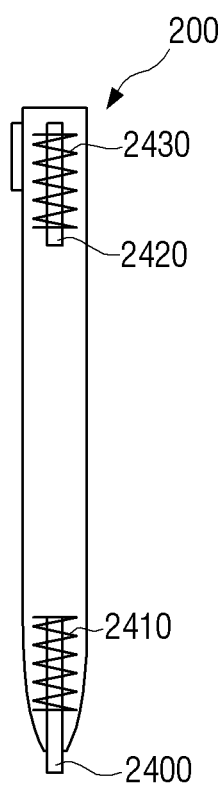
FIG. 24 is a view illustrating an example of a pen configuration used in a user terminal device according to the exemplary embodiment of FIG. 21.

FIG. 24 is a view illustrating an example of a configuration of the pen 200 that can be used according to the present exemplary embodiment. Referring to FIG. 24, cores 2400 and 2420 and coils 2410 and 2430 that are wound on the cores 2400 and 2420 are built in at both ends of the pen 200. Accordingly, a user's operation for a first end portion in which the first core 2400 and the first coil 2410 are built to touch or hover the screen and a user's operation for a second end portion in which the second core 2420 and the second coil 2430 are built to hover the screen can be discriminately recognized. FIG. 24 illustrates that the second core 2420 does not project out of the pen 200. However, according to other exemplary embodiments, the second core 2420 may also project out of the pen 200. In this case, the operation for the second core 429 to touch the screen can be separately recognized.

Figure 25:
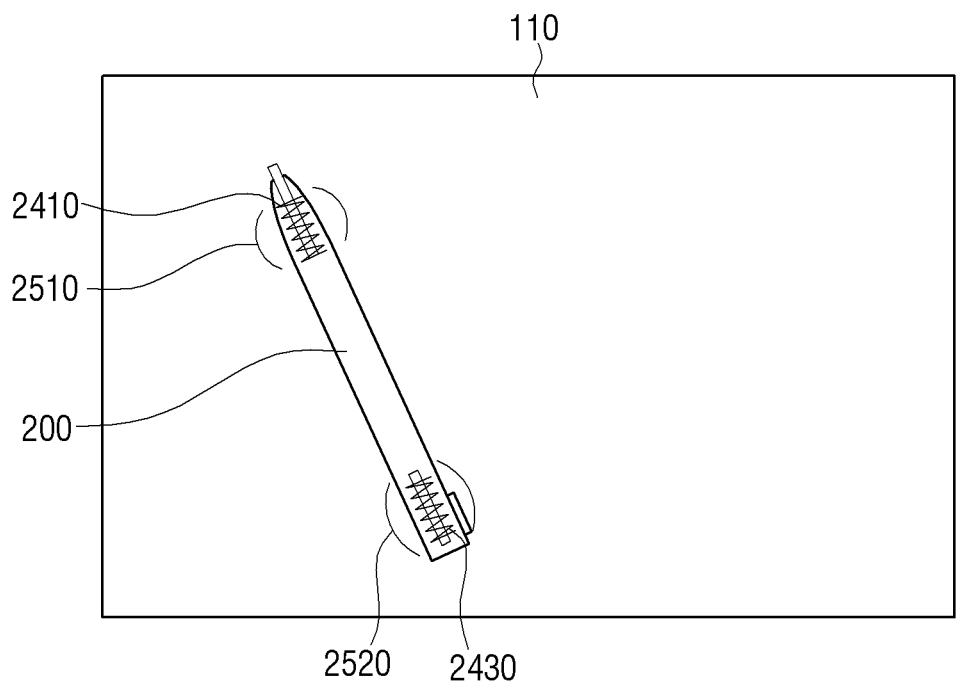
FIG. 25 is a view explaining a method for sensing a state where a pen is put.

FIG. 25 is a view explaining a method for sensing a state in which a pen 200 is put on a screen. In this case, the first core and the second core 2400 and 2420 do not directly touch the screen due to the body of the pen 200, and a plurality of hovering operations are sensed on the screen due to the coils 2410 and 2430 that are wound on the cores 2400 and 2420. The controller 130 confirms the points 2510 and 2520 at which the hovering is performed and calculates the distance between the points 2510 and 2520.

As a result, if the hovering operation of the pen 200 is simultaneously sensed at a plurality of points 2510 and 2520 on the display 110 and the distance between the plurality of points 2510 and 2520 corresponds to the length of the pen 200, the controller 130 may determine that the pen is put on the display 110.

Still Another Example of Interaction Operation

FIGS. 26 to 29 are views explaining various examples of an interaction method according to the exemplary embodiment of FIG. 21.

Figure 26:
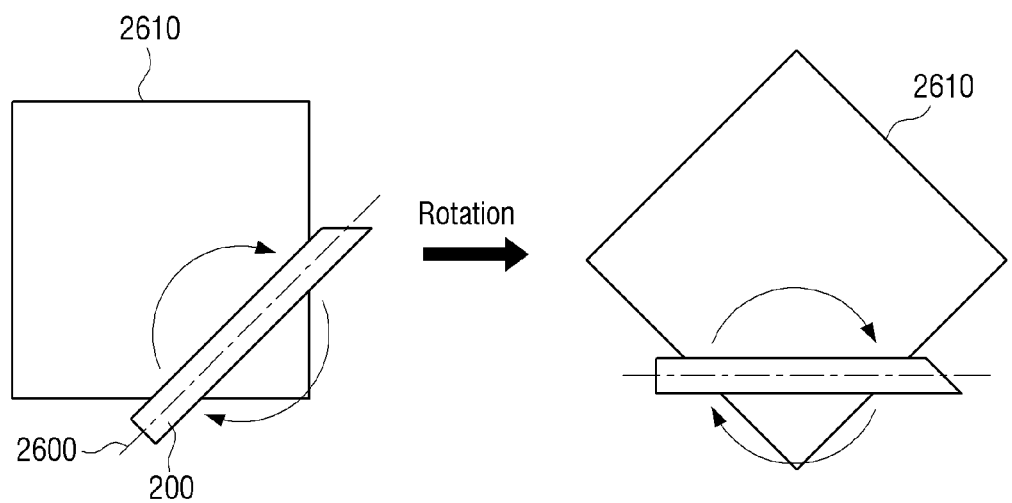
FIGS. 26 to 29 are views explaining various examples of an interaction method according to the exemplary embodiment of FIG. 21.

Referring to FIG. 26, the user can put the pen 200 on an object 2610 displayed on the screen. In this case, the controller 130 recognizes the position on which the pen 200 is put as a line 2600. If the user holds and rotates the pen 200 in this state, the pen 200 is rotated, and thus the object 2610 is also rotated. That is, after recognizing the line on which the pen 200 is put, the controller 130 may change the object according to the subsequent user operation based on the line, or perform various editing operations, such as position movement, size enlargement, reduction, deletion, or addition.

Figure 27:
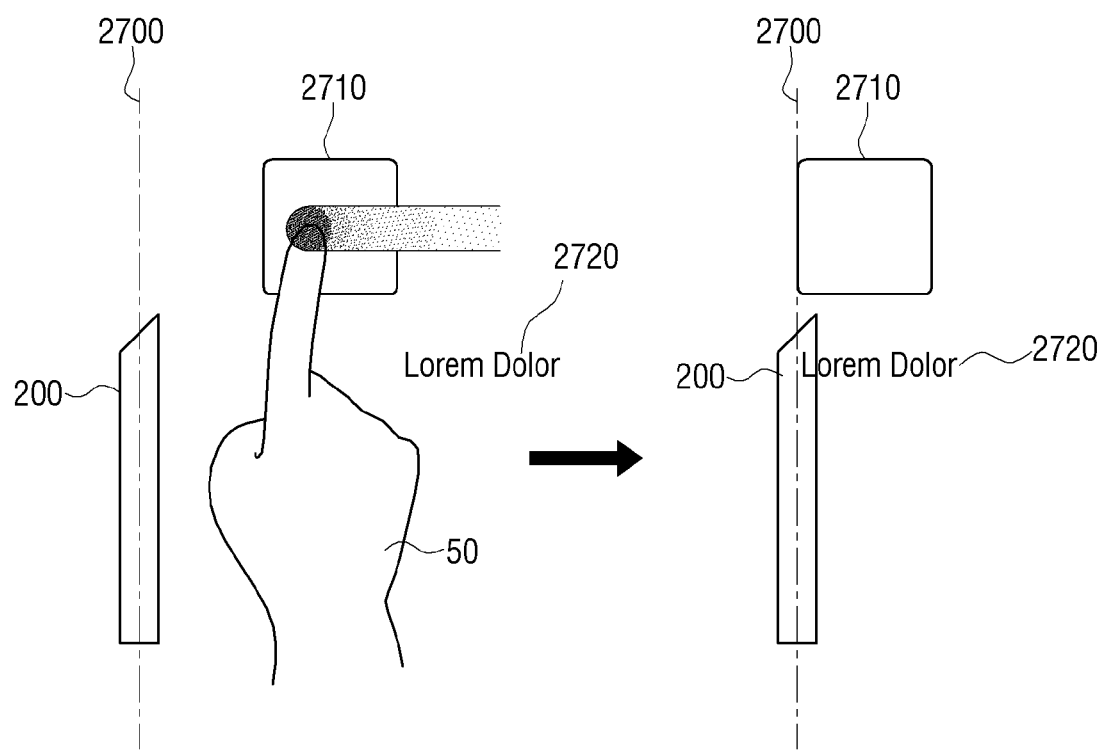

FIG. 27 is a view explaining an interaction operation for aligning the objects using the pen 200. Referring to FIG. 27, if the user puts the pen 200 on the screen, the controller 130 recognizes the position of the pen 200 as one line 2700. If the user performs a subsequent user operation to move objects 2710 and 2720 displayed on the screen towards the direction of the line 2700 on which the pen 200 is put in this state, the sensor 120 senses the subsequent user operation and notifies the controller 130 of the user operation. If the subsequent user operation is sensed, the controller 130 performs an interaction operation to align and display the objects based on the line 2700 through movement of the objects 2710 and 2720 in the direction of the line 2700.

Figure 28:
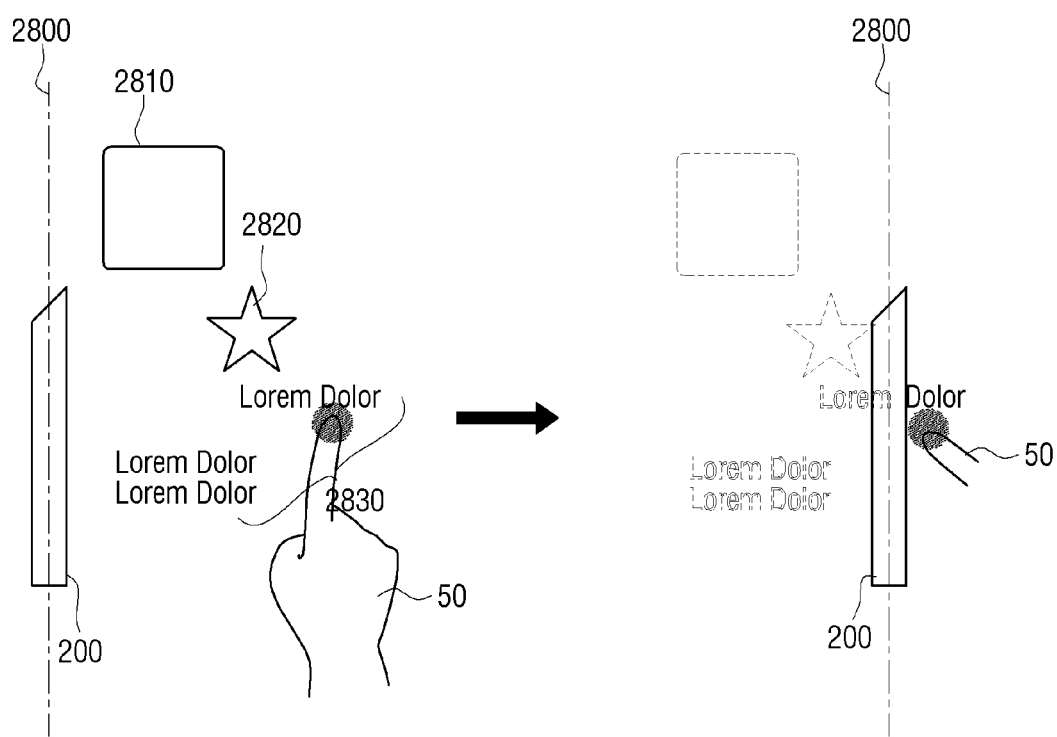

FIG. 28 is a view explaining an interaction operation according to still another exemplary embodiment. Referring to FIG. 28, if the user puts the pen 200 on the screen, the controller 130 recognizes the position of the pen 200 as one line 2800. Then, the controller 130 divides the entire screen into a plurality of regions based on the corresponding line 2800. FIG. 28 illustrates that the line 2800 is formed in a vertical direction and the screen is divided into a left region and a right region. If the user performs a subsequent user operation to move objects 2810 and 2820 in one region to the opposite region of the line 2800 in this state, the controller 130 moves the objects 2810 to 2830 to the opposite region and deletes the objects as the objects passes the line 2800. During the deletion, a graphic effect, in which the respective objects 2810 to 2830 gradually become transparent and then gradually disappear, may be provided, or a graphic effect, in which the respective objects fall to another layer based on the line 2800, may be provided.

Figure 29:
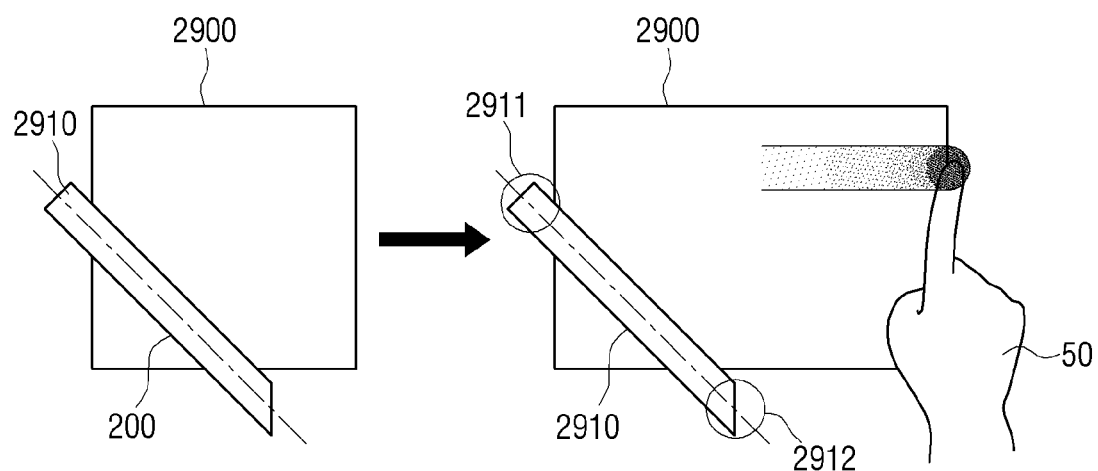

FIG. 29 is a view explaining an interaction operation according to still another exemplary embodiment of the present disclosure. Referring to FIG. 29, the user may put the pen 200 on an object 2900. If it is determined that the pen 200 is put on the object 2900 that is included in the screen displayed on the display 110, the controller 110 switches over to a second interaction mode. Then, the controller 130 senses a line on which the pen 200 is put. The controller 130 may determine the position of the line through sensing of hovering points 2911 and 2912 by both end portions of the pen 200. The controller 130 fixes the object 2900 based on the line, and changes the shape of the object 2900 according to the subsequent user operation. FIG. 29 illustrates that the user touches a corner portion of an upper end of the right side of the object 2900 with his or her finger 50 and performs dragging to the right side. The controller 130 performs an interaction operation to lengthen the object 2900 in the right direction according to the dragging. If the interaction operation is completed and the pen 200 is taken away from the screen, the controller 130 may display a screen that includes the enlarged object 2900 in the right direction.

As described above, the user may selectively perform a plurality of different interaction operations using various input devices, such as the pen 200 or the finger, in various ways. Accordingly, the functions of the user terminal device 100 can be used more conveniently and diversely.

Figure 30:
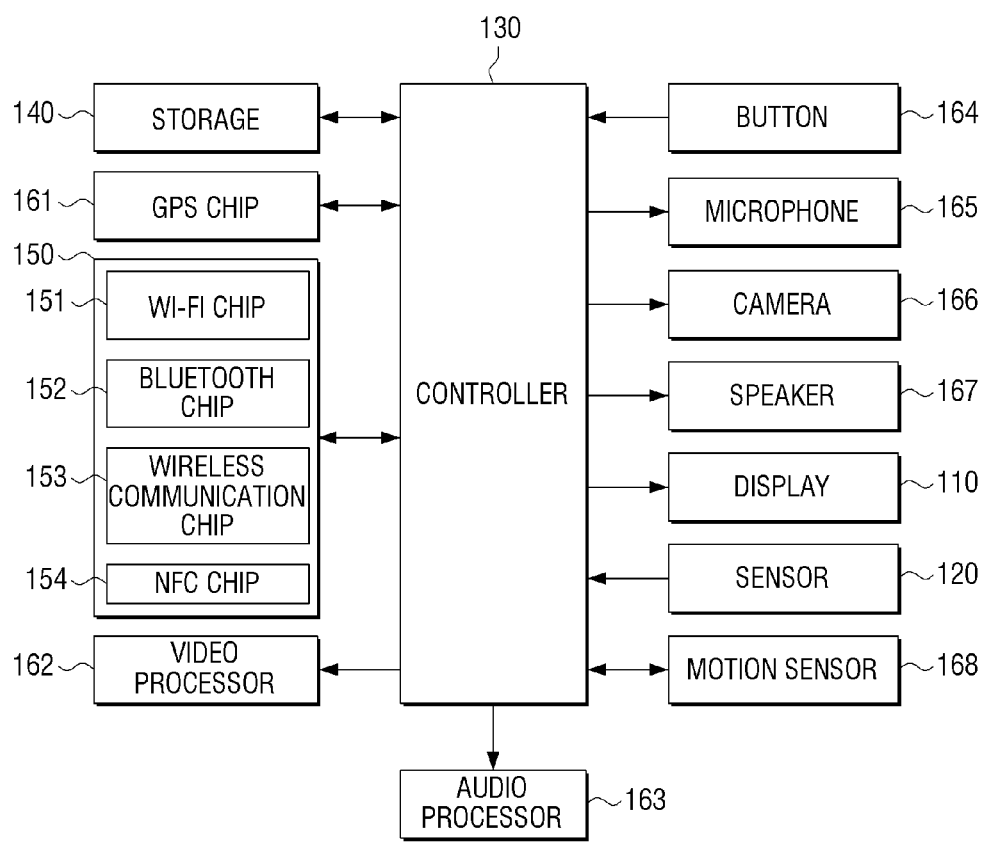
FIG. 30 is a block diagram synthetically illustrating the configuration of a user terminal device according to various exemplary embodiments.

The user terminal device 100 can be implemented as various types of electronic devices as described above. FIG. 30 is a block diagram illustrating an example of the detailed configuration of a user terminal device 100 that is implemented as a portable electronic device, such as a cellular phone, a tablet PC, and a PDA.

Referring to FIG. 30, a user terminal device 100 may include a display 110, a sensor 120, a controller 130, a storage 140, a communicator 150, a GPS chip 161, a video processor 162, an audio processor 163, a button 164, a microphone 165, a camera 166, a speaker 167, and a motion sensor 168.

The display 110 and the sensor 120 may be implemented in a touch screen shape as described above, may display various kinds of screens, and may sense a user operation that is performed with respect to the screen.

The controller 130 controls the overall operation of the user terminal device 100 using various kinds of programs and data stored in the storage 120. In particular, the controller 130 may sense a mount or non-mount position of the pen 200 and display different layout screens according to the result of the sensing.

Since the display 110, the sensor 120, and the controller 130 have been described in the descriptions of the above-described exemplary embodiments, repeated explanations thereof will be omitted.

The communicator 150 is configured to communicate with various types of external devices according to various types of communication methods. The communicator 150 includes a Wi-Fi chip 151, a Bluetooth chip 152, a wireless communication chip 153, and an NFC chip 154.

The Wi-Fi chip 151 and the Bluetooth chip 152 respectively perform communication using a Wi-Fi method and in a Bluetooth method. In the case of using the Wi-Fi chip 151 or the Bluetooth chip 152, various kinds of connection information, such as an SSID and secession key, are first transmitted or received, and after a communication connection is established using the connection information, various kinds of information can be transmitted or received. The wireless communication chip 153 refers to a chip that performs communication according to various communication standards, such as IEEE, ZigBee, 3G ($3^{rd}$ Generation), 3GPP ($3^{rd}$ Generation Partnership Project), and LTE (Long Term Evolution). The NFC chip 154 refers to a chip that operates using an NFC (Near Field Communication) method using a 13.56 MHz band among various RF-ID frequency bands, such as 135 kHz, 13.56 MHz, 433 MHz, 860 to 960 MHz, and 2.45 GHz.

The controller 130 performs communication with various kinds of external devices using the communicator 150. As an example, the controller 130 may download and install an application in the storage 140, and display an object that corresponds to the application. In this case, the corresponding application may match the existing object.

The GPS chip 161 is a constituent element that receives a GPS signal from a GPS (Global Positioning System) satellite and calculates the current position of the user terminal device 100. The controller 130 may calculate the user position using the GPS chip 161 if a navigation program is used or if the user's current position is required.

The video processor 162 is a constituent element that processes video data included in content received through the communicator 150 or stored in the storage 140. The video processor 162 may perform various image processes, such as decoding, scaling, noise filtering, frame rate conversion, and resolution conversion for the video data.

The audio processor 163 is a constituent element that processes content received through the communicator 150 or audio data included in the content stored in the storage 140. The audio processor 163 may perform various processes, such as decoding, amplification, and noise filtering of the audio data.

If a reproduction program for multimedia content is executed, the controller 130 drives the video processor 162 and the audio processor 163 to reproduce corresponding content. The display 110 may display an image frame that is generated by the video processor 162.

Further, the speaker 164 may output audio data generated by the audio processor 163.

The button 191 may include one or a plurality of various types of buttons, such as mechanical buttons, a touch pad, and a wheel, which may be formed on a certain region, such as a front portion, a side portion, or a back portion of a main body of the user terminal device 100.

The microphone 165 is a device configured to receive an input of a user voice or other sound and convert the input sound into audio data. The controller 130 may use the user voice input through the microphone 193 in a call process, or may convert the user voice into audio data to store the audio data in the storage 140.

The camera 166 is a device configured to capture a still image or a moving image under the control of a user. A plurality of cameras 166, such as a front camera and a back camera, may be implemented.

In the case where the camera 166 and the microphone 165 are provided, the controller 130 may perform a control operation depending on the user's voice input through the microphone 165 or a user's motion recognized by the camera 166. That is, the user terminal device 100 may operate in a motion control mode or in a voice control mode. In the case of operating in the motion control mode, the controller 130 activates the camera 166 to capture an image of the user, tracks the change of the user's motion, and performs the corresponding control operation. In the case of operating in the voice control mode, the controller 130 may operate in the voice recognition mode in which the controller 130 analyzes the user's voice input through the microphone 165 and performs a control operation depending on the analyzed user voice.

In the user terminal device 100 that supports a motion control mode or a sound control mode, voice recognition technology or motion recognition technology may be used in the above-described various exemplary embodiments. For example, if the user makes a motion as if the user is selecting an object displayed on a home screen, or states a voice command that corresponds to the object, it is determined that the corresponding object is selected and the control operation that matches the object may be performed.

The motion sensor 168 is a constituent element that senses the motion of the main body of the user terminal device 100. That is, the user terminal device 100 may be rotated or tilted in various directions. The motion sensor 168 may sense motion characteristics, such as a rotation direction, angle, and tilt, using at least one of various types of sensors, such a geomagnetic sensor, a gyro sensor, and an acceleration sensor.

In addition, although not illustrated in FIG. 30, according to exemplary embodiments, the user terminal device 100 may further include a USB port to which a USB connector is connected, various external input ports for connecting various external terminals such as a headset, mouse, and LAN, and a DMB chip that receives and processes a DMB (Digital Multimedia Broadcasting) signal.

Figure 31:
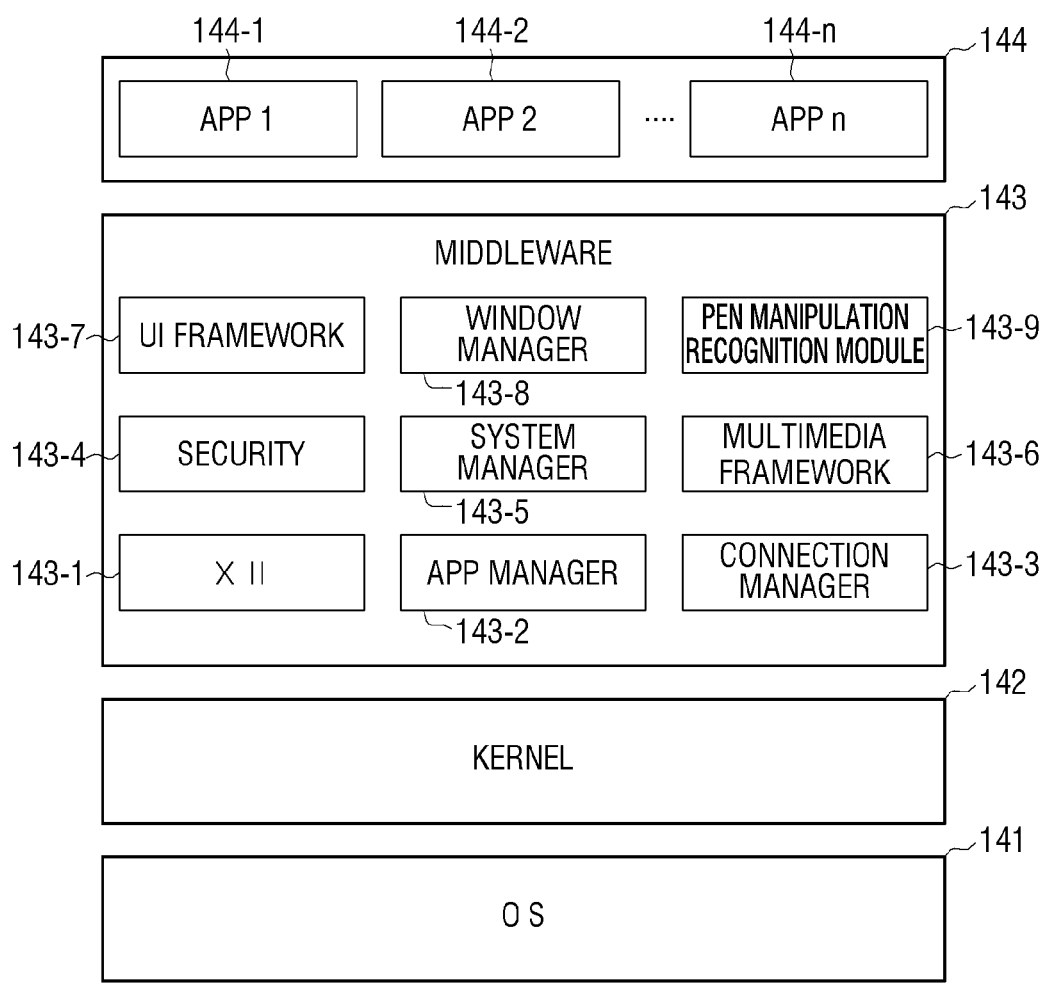
FIG. 31 is a diagram illustrating an example of a program configuration that can be used in a user terminal device according to various exemplary embodiments.

FIG. 31 is a diagram illustrating an example of a program configuration that can be used in a user terminal device according to various exemplary embodiments. Software of FIG. 31 may be stored in the storage 140, but is not limited thereto. The software may be stored in various types of storage devices used with the user terminal device 100, for example, software stored remotely and transmitted to the user terminal device 100 over a network, e.g., the Internet.

Referring to FIG. 31, in the user terminal device 100, software including an OS 141, a kernel 142, middleware 143, and applications may be stored.

The OS (Operating System) 141 controls and manages the overall operation of hardware. That is, the OS 141 is a layer that takes charge of basic functions, such as hardware management, memory, and security.

The kernel 142 serves as a path that transfers various kinds of signals sensed by the sensor 120 to the middleware 143.

The middleware 143 includes various kinds of software modules that control the operation of the user terminal device 100. Referring to FIG. 31, the middleware 143 includes an X11 module 143-1, an APP manager 143-2, a connection manager 143-3, a security module 143-4, a system manager 143-5, a multimedia frame network 143-6 (e.g., multimedia framework), a UI frame network 143-7 (e.g., UI framework), a window manager 143-8, and a pen operation recognition module 143-9 (e.g., pen manipulation recognition module).

The X11 module 143-1 is a module that receives various kinds of event signals from various kinds of hardware modules provided in the user terminal device 100. According to an exemplary embodiment, various types of events may be diversely set, such as a user operation sensing event, a system alarm generation event, and a specific program execution or end event.

The APP manager 143-2 is a module that manages execution states of various kinds of applications installed in the storage 140. If an event that an application execution command is input from the X11 module 143-2 is sensed, the APP manager 143-2 calls and executes an application that corresponds to the corresponding event. That is, if an event that at least one object is selected on the screen is sensed, the APP manager 143-2 calls and executes an application that corresponds to the object.

The connection manager 143-3 is a module for supporting a wired or wireless network connection. The connection manager 143-3 may include various types of modules, such as a DNET module or a UPnP module.

The security module 143-4 is a module that supports hardware certification, request permission, and security storage.

The system manager 143-5 monitors states of various constituent elements in the user terminal device 100, and provides the result of monitoring to other modules. For example, if the battery residual amount is insufficient, an error occurs, or a communication connection is intercepted, the system manager 143-5 provides the monitoring result to the UI frame work 143-7 and outputs an alarm message or an alarm sound.

The multimedia frame work 143-6 is a module that reproduces multimedia content that is stored in the user terminal device 100 or is provided from an external source. The multimedia frame work 143-6 may include a player module, a camcorder module, and a sound processing module. Accordingly, the multimedia frame work 143-6 may reproduce various kinds of multimedia content, and generate and reproduce an image and sound.

The UI frame work 143-7 is a module that provides various kinds of UIs. The UI frame work 143-7 may include an image compositor module constituting various kinds of objects, a coordinate synthesizer that calculates coordinates on which the object is to be displayed, a rendering module that renders the constructed object on the calculated coordinates, and a 2D or 3D UI tool kit that provides a tool for constructing 2D or 3D UIs. The controller 130 may execute the UI frame work 143-7 and may display the interaction operation according to various interaction modes as described above on the screen.

The window manager 143-8 may sense a touch event or other input event using a user's body or pen. If such an event is sensed, the window manager 143-8 performs an operation that corresponds to the event through a transfer of the event signal to the UI frame work 142-7.

The pen operation recognition module 143-9 is a module that senses various kinds of user operations using the pen 200. Specifically, if the pen 200 touches the screen, the pen operation recognition module 143-9 calculates the touch area based on the number of touch sensors that output sensed values and positions thereof, and compares the touch area with a preset condition. The CPU 133 may determine the interaction mode based on the result of the comparison. Further, as described above with reference to FIG. 25, if hovering is sensed at a plurality of points, the pen operation recognition module 143-9 compares the result of the sensing with the preset condition. The CPU may determine the interaction mode based on the result of the comparison.

In addition, if the user performs a pen drawing on the surface of the display 110, the pen operation recognition module 143-9 may recognize the pen drawing through parsing of the drawing trace. In this case, the pen operation recognition module 143-9 receives coordinate values of the points that are touched by the pen recognition panel 121, and stores the coordinate values of the touched points as a stroke. Further, the handwriting recognition module 143-9 may generate a stroke array using the stroke. The handwriting recognition module 143-9 may recognize the handwriting contents through a comparison of the pre-stored handwriting library with the generated stroke array. The recognized handwriting contents are provided to the application manager 143-2, and the application manager 143-2 provides the handwriting contents to the application that corresponds to the object at the point at which the user handwriting is performed. Accordingly, as described above, the control operation based on the handwriting contents recognized by the application can be performed.

According to an exemplary embodiment, if the user touches or draws on the surface of the display 110 using various input devices, such as a finger or a pen, the UI frame network 143-7 can draw various graphic lines according to the user operation. Specifically, if the user draws a figure on the screen using the pen 200, the controller 130 draws graphic lines at each point where the pen 200 passes according to the execution of the UI frame work 143-7. The thickness of the line may differ depending on the pressure that is applied onto the screen or the area on which the pen 200 and the screen come into contact with each other, and the colors or line shapes may be variously changed according to the user's setting items.

Further, if an event, such as a pen separation or a pen mount, occurs, the UI frame work 143-7 may change the layout of the UI screen that is currently displayed.

The application module 144 includes applications 144-1 to 144-n for supporting various functions. For example, the application module 144 may include program modules for providing various services, such as a navigation program module, a game module, an e-book module, a calendar module, and an alarm management module. Such applications may be installed by default or may be optionally installed by the user in the use process.

The software structure shown in FIG. 31 is merely exemplary, and the exemplary embodiments are not limited thereto. If needed, a partial omission, modification, or addition thereof may be made. For example, various programs, such as a sensing module that analyzes signals sensed by various kinds of sensors, a messaging module such as a messenger program, an SMS (Short Message Service) & MMS (Multimedia Message Service) program, and an e-mail program, a call info aggregator program module, a VoIP module, and a web browser module, may be additionally provided in the storage 140.

As described above, according to various exemplary embodiments, the user can conveniently perform various interaction operations. In particular, the user can determine the interaction mode through a comparison of various parameters that may differ according to the pen use methods, such as a pen touch area, a position of a touch or hovering point, the number of touch or hovering points, a distance between touch or hovering points, and a touch or hovering strength, with preset threshold values. Accordingly, the user can promptly select and use various operations using the pen characteristics without any separate button operation. As a result, the utility of the user terminal device and the pen can be greatly improved.

The various interaction methods as described above may be implemented by a program code, and may be provided in a state where the various interaction methods are stored in a non-transitory computer readable medium.

Specifically, a program code may be stored in the non-transitory computer readable medium, the program code implementing an interaction method which includes operating, if a pen touch with respect to a screen of the user terminal device is sensed, in a first interaction mode to perform an operation that corresponds to a touch point of a pen; switching over to a second interaction mode if it is determined that the pen is put on the screen; and performing, if a subsequent user operation is performed in a state where the user terminal device operates in the second interaction mode, an interaction operation that corresponds to a line on which the pen is put and the subsequent user operation.

Further, in the exemplary embodiments using a pen having a nib portion that includes a core connected to a built-in coil and a conductor connected to a conductive body, a program code may be stored in the non-transitory computer readable medium, the program code implementing an interaction method which includes sensing whether the pen touches a screen, performing a first interaction operation if the conductor touches the screen, and performing a second interaction operation that is different from the first interaction operation if the core touches the screen.

The non-transitory readable medium may be mounted on various devices to be used, and the various devices may perform the interaction methods according to various exemplary embodiments as described above.

According to an exemplary embodiment, the non-transitory computer readable medium is not a medium that stores data for a short period, such as a register, a cache, or a memory, but rather, is a medium which semi-permanently stores data and is readable by a device. Specifically, various applications and programs as described above may be stored and provided in the non-transitory computer readable medium, such as, a CD, a DVD, a hard disc, a Blu-ray disc, a USB, a memory card, and a ROM. Of course, other exemplary embodiments are not limited thereto.

While the exemplary embodiments have been shown and described with reference to certain exemplary embodiments thereof, it will be understood by those skilled in the art that various changes in form and detail may be made therein without departing from the spirit and scope of the exemplary embodiments, as defined by the appended claims.

What is claimed is:

1. An electronic device comprising:
a sensor configured to sense orientation and movement of a pen comprising a nib and a body connected to the nib, with respect to a display, by sensing electrical output from the pen; and
a controller configured to control the electronic device to operate in a first interaction mode in which an operation that corresponds to a touch point of the nib of the pen is performed if a pen touch with respect to the display is sensed by the sensor, and control the electronic device to operate in a second interaction mode if the controller determines that the body of the pen is put on the display, wherein, in the second interaction mode, the controller is further configured to determine a line formed at a position where the body of the pen contacts the display, and control the electronic device to perform at least one of position movement, size enlargement, and size reduction for a graphical object displayed on the display based on movement of the line resulting from the movement of the pen on the display.

2. The electronic device as claimed in claim 1, wherein if the sensor simultaneously senses a hovering operation of the pen at a plurality of points on the display, and the controller determines that a distance between the plurality of points corresponds to a length of the pen, the controller thereby determines that the pen is put on the display.

3. The electronic device as claimed in claim 1, wherein if the sensor senses that the graphical object displayed on the display is touched by the nib of the pen in the first interaction mode, the controller executes a program that matches the graphical object.

4. The electronic device as claimed in claim 1, wherein if the sensor senses that a drawing is created by the nib of the pen on a screen displayed on the display in the first interaction mode, the controller displays a line according to a trace of the drawing.

5. The electronic device as claimed in claim 1, wherein if the controller determines that the body of the pen is put on the graphical object displayed on the display, the controller controls the electronic device to operate in the second interaction mode, to fix the graphical object based on the line on the display on which the pen is put, and to change a shape of the graphical object according to a subsequent user operation.

6. The electronic device as claimed in claim 1, wherein if the sensor senses a subsequent user operation to move the graphical object displayed on the display in a direction towards the line on the display on which the pen is put in the second interaction mode, the controller aligns the graphical object based on the line.

7. An electronic device comprising:
a sensor configured to sense orientation and movement of a pen by the pen having a nib comprising a core connected to a built-in coil and a conductor connected to a conductive body by sensing electrical output from the pen; and
a controller configured to control the electronic device to operate in a first interaction operation if the conductor touches a display and to control the electronic device to operate in a second interaction operation that is different from the first interaction operation if the core touches the display,
wherein the controller is further configured to control the electronic device to perform at least one of position movement, size enlargement, and size reduction for a graphical object displayed on the display based on the movement of the pen on the display in the second interaction mode.

8. The electronic device as claimed in claim 7, wherein the first interaction operation is an operation to select an object displayed at a touch point, and the second interaction operation is an operation to draw a line along a handwriting trace of the pen.

9. An interaction method of an electronic device, the interaction method comprising:

first operating, in response to sensing a pen touch with respect to a display of the electronic device, in a first interaction mode to perform an operation that corresponds to a touch point of a nib of a pen, the pen comprising the nib and a body connected to the nib;
second operating, in response to determining that the body of the pen is put on the display, in a second interaction mode comprising:
determining a line formed at a position where the body of the pen contacts the display; and
performing at least one of position movement, size enlargement, and size reduction for a graphical object displayed on the display based on movement of the line resulting from movement of the pen on the display in the second interaction mode.

10. The interaction method as claimed in claim 9, wherein the second operating comprises determining that the body of the pen is put on the display in response to simultaneously sensing a hovering operation of the pen at a plurality of points on the display and determining that a distance between the plurality of points corresponds to a length of the pen.

11. The interaction method as claimed in claim 9, further comprising executing, in response to determining that the graphical object that is displayed on the display is touched by the nib of the pen in the first interaction mode, a program that matches the graphical object.

12. The interaction method as claimed in claim 9, further comprising displaying, in response to sensing a drawing by the nib of the pen on the display in the first interaction mode, a line according to a trace of the drawing.

13. The interaction method as claimed in claim 9, wherein the performing the interaction operation comprises fixing, if the body of the pen is put on the graphical object that is displayed on the display, the graphical object based on the line on which the pen is put, and changing a shape of the object according to the subsequent user operation.

14. The interaction method as claimed in claim 9, wherein the performing the interaction operation comprises aligning, in response to sensing the subsequent user operation to move the graphical object that is displayed on the display in a direction towards the line on which the pen is put in the second interaction mode, the graphical object based on the line.

15. An interaction method of an electronic device, the interaction method comprising:
sensing whether a pen having a nib comprising a core connected to a built-in coil and a conductor connected to a conductive body touches a display of the electronic device; and
performing a first interaction operation if the sensing indicates that the conductor touches the display and performing a second interaction operation that is different from the first interaction operation if the sensing indicates that the core touches the display,
wherein the performing the first interaction operation comprises determining a line formed at a position where the conductor touches the display, and controlling the electronic device to perform at least one of position movement, size enlargement, and size reduction for a graphical object displayed on the display based on movement of the line resulting from movement of the pen on the display.

16. The interaction method as claimed in claim 15, wherein the first interaction operation is an operation to select the graphical object displayed at a touch point, and the second interaction operation is an operation to draw a line along a handwriting trace of the pen.

17. An electronic device comprising:
a sensor configured to sense orientation and movement of a pen comprising a nib that is formed in an inclined line edge shape and a body connected to the nib by sensing electrical output from the pen; and
a controller configured to control the electronic device to operate in one of a plurality of different interaction modes according to a touch area if the pen touches a display and to control the electronic device to perform an interaction operation that corresponds to the touch area of the pen,
wherein, in one of the interaction modes, the controller controls the electronic device to determine a line formed at a position where the body of the pen contacts the display, and to perform at least one of position movement, size enlargement, and size reduction for a graphical object displayed on the display based on movement of the line resulting from the movement of the pen on the display.

18. A mobile device comprising:
a sensor configured to sense a first orientation and movement of a pen comprising a nib and a body connected to the nib, the first orientation and movement indicating that the pen is touching a display of the mobile device in a first touch area, and to sense a second orientation and movement of the pen indicating that the touching device is touching the display in a second touch area, the first touch area being smaller than the second touch area; and
a controller configured to control the mobile device to perform a first interaction operation in response to the sensor sensing the first orientation and movement of the pen, and to control the mobile device to perform a second interaction operation which is different from the first interaction operation in response to the sensor sensing the second orientation and movement of the pen,
wherein, when the body of the pen contacts the display, the controller is further configured to determine a line formed at a position where the body of the pen contacts the display, and control the mobile device to perform at least one of position movement, size enlargement, and size reduction for a graphical object displayed on the display based on movement of the line resulting from movement of the pen on the display.

19. The mobile device as claimed in claim 18, wherein the first interaction operation comprises drawing a line on a screen of the display according to a movement of the pen, and the second interaction operation comprises scrolling the screen according to the movement of the pen.

20. The mobile device as claimed in claim 18, wherein the first interaction operation comprises drawing a line on a screen of the display according to a movement of the pen, and the second interaction operation comprises erasing the line according to the movement of the pen.

* * * * *